US012584748B2

(12) United States Patent　　　(10) Patent No.:　US 12,584,748 B2
Masad et al.　　　　　　　　　　　　(45) Date of Patent:　　Mar. 24, 2026

(54) SELF-CALIBRATING INERTIAL MEASUREMENT SYSTEM AND METHOD

(71) Applicant: Elbit Systems Ltd., Haifa (IL)

(72) Inventors: Eyal Masad, Haifa (IL); Eugene Gurovich, Haifa (IL); Yoav Ophir, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 16/462,067

(22) PCT Filed: Nov. 13, 2017

(86) PCT No.: PCT/IL2017/051229

§ 371 (c)(1),
(2) Date: May 17, 2019

(87) PCT Pub. No.: WO2018/092124

PCT Pub. Date: May 24, 2018

(65) Prior Publication Data

US 2019/0277655 A1　　　Sep. 12, 2019

(30) Foreign Application Priority Data

Nov. 17, 2016　　(IL) ......................................... 249050

(51) Int. Cl.
*G01C 21/16*　　　　(2006.01)
*G01C 25/00*　　　　(2006.01)
(52) U.S. Cl.
CPC ........... *G01C 21/183* (2020.08); *G01C 25/00* (2013.01); *G01C 25/005* (2013.01)
(58) Field of Classification Search
CPC .................................................. G01C 21/183
See application file for complete search history.

(56) References Cited

U.S. PATENT DOCUMENTS

| 4,125,017 A | 11/1978 | Dhuyvetter et al. |
| 4,179,818 A | 12/1979 | Craig |
| | (Continued) | |

FOREIGN PATENT DOCUMENTS

| EP | 0686830 B1 | 8/1998 |
| GB | 2146776 B | 7/1986 |
| | (Continued) | |

OTHER PUBLICATIONS

International Search Report and Written Opinion mailed Mar. 8, 2018, for PCT/IL2017/051229, filed Nov. 13, 2017.

(Continued)

*Primary Examiner* — Hyun D Park
(74) *Attorney, Agent, or Firm* — Brown Rudnick LLP; Matthew P. York

(57)　　　　　ABSTRACT

An inertial measurement system comprising at least one sensor cluster comprising a plurality of inertial sensors for sampling at least one of acceleration and angular velocity of said at least one sensor cluster with respect to each axis in a plurality of axes of a reference frame, and for producing individual outputs associated with said at least one of acceleration and angular velocity, at least three of said inertial sensors said sampling with respect to each same respective said axis; and a processing engine for receiving said individual outputs, combining said individual outputs to yield respective combined outputs, detecting which of said individual outputs diverges from at least one of their inter-comparison, and its respective combined output, according to a decision rule, said processing engine configured to dynamically self-calibrate a parameter that includes individual scale factor of those said inertial sensors whose said individual outputs were detected to diverge.

23 Claims, 9 Drawing Sheets

(56) References Cited

U.S. PATENT DOCUMENTS

| | | | |
|---|---|---|---|
| 4,566,327 A | 1/1986 | Rider | |
| 4,601,206 A | 7/1986 | Watson | |
| 6,122,538 A | 9/2000 | Sliwa, Jr. et al. | |
| 6,128,955 A | 10/2000 | Mimura | |
| 6,484,577 B1 | 11/2002 | Bennett | |
| 7,257,512 B1 | 8/2007 | Ackerman | |
| 7,395,709 B2 | 7/2008 | Noda et al. | |
| 8,020,442 B2 | 9/2011 | Ell et al. | |
| 8,037,759 B2 | 10/2011 | Peters et al. | |
| 8,056,412 B2 | 11/2011 | Rutkiewicz et al. | |
| 8,260,477 B2 | 9/2012 | Almalki et al. | |
| 8,756,995 B2 | 6/2014 | Tzidon et al. | |
| 8,762,091 B1 | 6/2014 | Foxlin et al. | |
| 2002/0065626 A1 | 5/2002 | McCall et al. | |
| 2006/0152842 A1 | 7/2006 | Pasolini et al. | |
| 2008/0021336 A1 | 1/2008 | Dobak | |
| 2008/0269963 A1 | 10/2008 | Vos et al. | |
| 2009/0281756 A1* | 11/2009 | Weed | G01P 15/18 |
| | | | 702/104 |
| 2010/0268414 A1 | 10/2010 | Petillon et al. | |
| 2011/0209544 A1 | 9/2011 | Tzidon et al. | |
| 2012/0215477 A1* | 8/2012 | Tuck | G01P 21/00 |
| | | | 702/99 |
| 2013/0297250 A1 | 11/2013 | Tzidon et al. | |
| 2014/0298906 A1 | 10/2014 | Tzidon et al. | |
| 2015/0233730 A1* | 8/2015 | Guillet | G01C 21/165 |
| | | | 701/3 |
| 2016/0341579 A1* | 11/2016 | Kimura | H03L 1/00 |
| 2018/0066961 A1* | 3/2018 | Trusov | G01C 25/005 |
| 2018/0164341 A1* | 6/2018 | Anderson | G01P 21/00 |

FOREIGN PATENT DOCUMENTS

| | | | |
|---|---|---|---|
| WO | 1995026492 A1 | 10/1995 | |
| WO | 2016023224 A1 | 2/2016 | |

OTHER PUBLICATIONS

European Search Report issued in European Application No. 17870749. 3, date of mailing: Jun. 17, 2020, 11 pages.

* cited by examiner

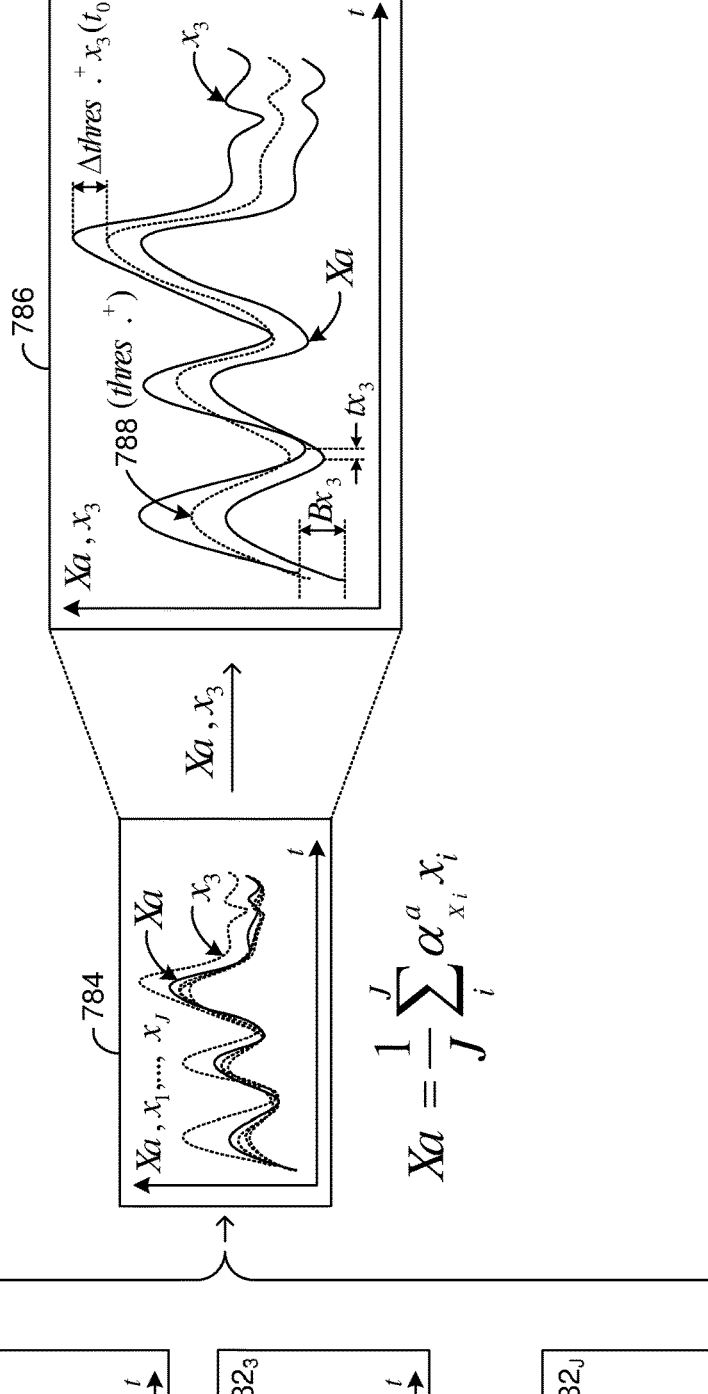
$$Xa = \frac{1}{J}\sum_{i}^{J} \alpha_{x_i}^{a} x_i$$
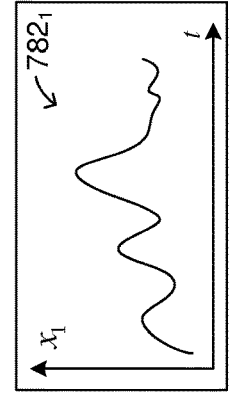
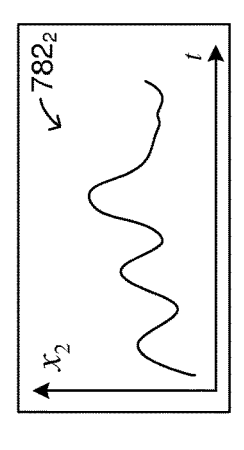
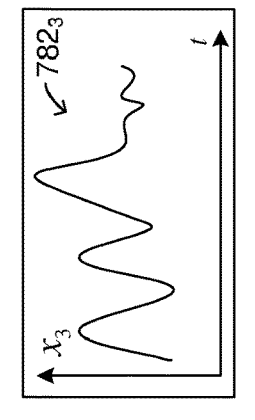
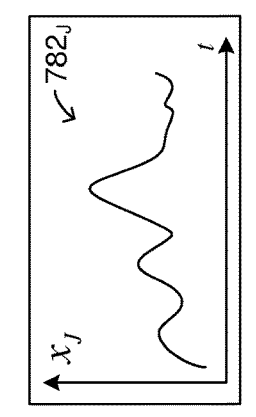
FIG. 3

Figure 7:
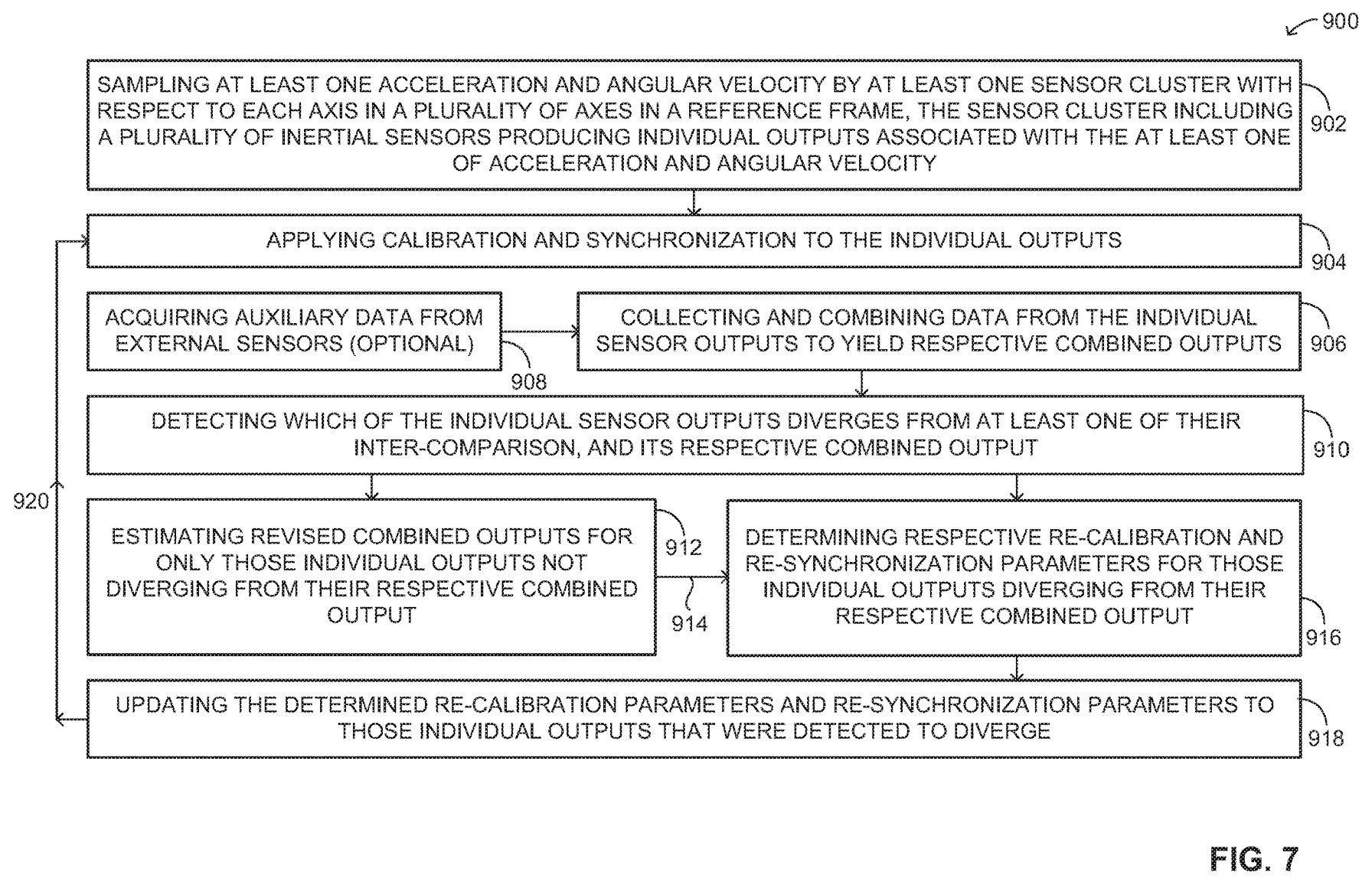

900

902 — SAMPLING AT LEAST ONE ACCELERATION AND ANGULAR VELOCITY BY AT LEAST ONE SENSOR CLUSTER WITH RESPECT TO EACH AXIS IN A PLURALITY OF AXES IN A REFERENCE FRAME, THE SENSOR CLUSTER INCLUDING A PLURALITY OF INERTIAL SENSORS PRODUCING INDIVIDUAL OUTPUTS ASSOCIATED WITH THE AT LEAST ONE OF ACCELERATION AND ANGULAR VELOCITY

904 — APPLYING CALIBRATION AND SYNCHRONIZATION TO THE INDIVIDUAL OUTPUTS

906 — COLLECTING AND COMBINING DATA FROM THE INDIVIDUAL SENSOR OUTPUTS TO YIELD RESPECTIVE COMBINED OUTPUTS

908 — ACQUIRING AUXILIARY DATA FROM EXTERNAL SENSORS (OPTIONAL)

910 — DETECTING WHICH OF THE INDIVIDUAL SENSOR OUTPUTS DIVERGES FROM AT LEAST ONE OF THEIR INTER-COMPARISON, AND ITS RESPECTIVE COMBINED OUTPUT

912 / 914 — ESTIMATING REVISED COMBINED OUTPUTS FOR ONLY THOSE INDIVIDUAL OUTPUTS NOT DIVERGING FROM THEIR RESPECTIVE COMBINED OUTPUT

916 — DETERMINING RESPECTIVE RE-CALIBRATION AND RE-SYNCHRONIZATION PARAMETERS FOR THOSE INDIVIDUAL OUTPUTS DIVERGING FROM THEIR RESPECTIVE COMBINED OUTPUT

918 — UPDATING THE DETERMINED RE-CALIBRATION PARAMETERS AND RE-SYNCHRONIZATION PARAMETERS TO THOSE INDIVIDUAL OUTPUTS THAT WERE DETECTED TO DIVERGE

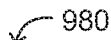
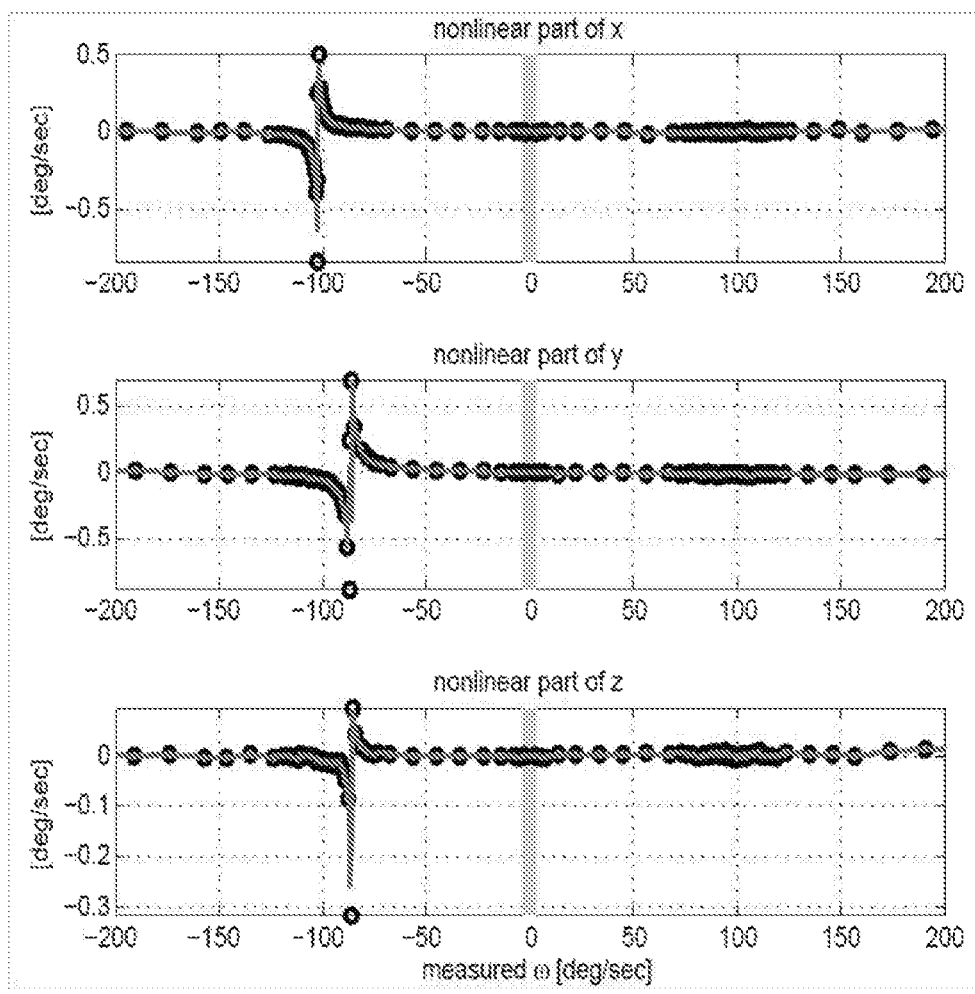
FIG. 8D

SELF-CALIBRATING INERTIAL MEASUREMENT SYSTEM AND METHOD

FIELD OF THE DISCLOSED TECHNIQUE

The disclosed technique relates to inertial measurements, and more particularly, to clusters of inertial sensors used for inertial measurements.

BACKGROUND OF THE DISCLOSED TECHNIQUE

Inertial navigation systems (INS), which employ sensors, such as accelerometers and gyroscopes for measuring position, orientation and velocity of an object (e.g., aircraft, ship, spacecraft, guided missile) are prone to errors. Inertial micro-machine systems (or micro inertial measurement units) constructed with microelectromechanical systems (MEMS) technology are widely used for inertial navigation. One example of a typical error encountered in such sensors may be termed as "aging", which is a process occurring over time that influences the variation of output measurements produced by a sensor in response to a particular input. For example, the properties of MEMS sensors in a sensor cluster may change (and even differently) when subjected to shocks such as physical impact, extreme acceleration, as well as temperature and electromagnetic pulses. Prior art techniques endeavoring to counter the effects of aging utilize repeated recalibration of the MEMS sensor elements. Restoring the initial micro-machine quality involves recalibrating the entire sensor cluster, typically requiring dismounting of the inertial measurement unit from the object, and conducting a time consuming and burdensome calibration process using specialized calibration equipment such as rotating tables, magnetic field-free or regulated environments, pressure and temperature-controlled environments, and the like. In general, MEMS sensors that are mis-calibrated may adversely affect the accuracy of the measurements.

SUMMARY OF THE PRESENT DISCLOSED TECHNIQUE

The disclosed technique overcomes the disadvantages of the prior art by providing an inertial measurement system including at least one sensor cluster and a processing engine. The at least one sensor cluster includes a plurality of inertial sensors for sampling at least one of acceleration and angular velocity of the at least one sensor cluster with respect to each axis in a plurality of axes of a reference frame. The sensor cluster is configured and operative for producing individual outputs associated with the acceleration and angular velocity. At least three of the inertial sensors are configured and operative for the sampling with respect to each same respective axis. The processing engine is configured and operative for receiving individual outputs, combining the individual outputs to yield respective combined outputs, detecting which of the individual outputs diverges from at least one of their inter-comparison, and its respective combined output, according to a decision rule with respect to at least one feature. The processing engine is configured during operation and during at least one of acceleration and angular velocity to dynamically self-calibrate at least one parameter. The at least one parameter includes individual scale factor of those inertial sensors whose individual outputs were detected to diverge, by respectively applying individual gain corrections; individual cross-axis sensitivity of the inertial sensors whose individual outputs were detected to diverge, by respectively applying individual cross-axis corrections; and individual bias of those inertial sensors whose individual outputs were detected to diverge, by respectively applying individual bias corrections.

According to another aspect of the disclosed technique there is thus provided an inertial measurement system including at least one sensor cluster, and a processing engine. The sensor cluster includes a plurality of inertial sensors for sampling at least one of acceleration and angular velocity of at least one sensor cluster with respect to each axis in a plurality of axes of a reference frame. The sensor cluster is configured and operative for producing individual outputs associated with the acceleration and angular velocity. Each inertial sensor has its respective operating dynamic range and characteristic sensor response. At least some of the inertial sensors have different and partially overlapping operating dynamic ranges. The processing engine is configured and operative for receiving the individual outputs, detecting kinematical properties during operation of the at least one sensor cluster. For each axis, the processor is configured and operative for dynamically combining the individual outputs from the inertial sensors, according to an association that relates the different and partially overlapping operating dynamic ranges of the inertial sensors with detected kinematical properties, according to a predominance scheme relating to each characteristic sensor response.

In accordance with a further aspect of the disclosed technique there is thus provided an in-use (during operation) self-calibrating inertial measurement method for minimizing errors of at least one inertial measurement unit (IMU) associated with calibration parameters. (The calibration during operation is achieved by the IMU itself.) The method includes sampling at least one of acceleration and angular velocity with respect to at least one axis in a plurality of axes of a reference frame, producing a plurality of individual outputs associated with acceleration and angular velocity for at least one axis, combining the individual outputs to yield respective combined outputs, detecting which of the individual outputs diverges from at least one of their inter-comparison, and its respective combined output, according to a decision rule with respect to at least one feature, estimating revised combined outputs for the individual outputs, according to the detecting, determining respective re-calibration parameters for those individual outputs diverging from their respective combined output, and updating, during operation of the at least one IMU, the calibration parameters with the re-calibration parameters for those individual outputs that were detected to diverge.

BRIEF DESCRIPTION OF THE DRAWINGS

The disclosed technique will be understood and appreciated more fully from the following detailed description taken in conjunction with the drawings in which:

FIG. 3 is a schematic diagram illustrating divergence detection of a sensor output from its corresponding combined output in a particular sensor group and type, constructed and operative in accordance with the embodiment of the disclosed technique;

FIG. 7 is a schematic block diagram of a self-calibrating inertial measurement method, constructed and operative in accordance with the embodiment of the disclosed technique;

FIG. 8D illustrates three data graphs corresponding to the outputs of a 3-axis gyroscope sensor plotting gyroscope angular velocity measurements having non-linearity that is confined to a relatively narrow range.

DETAILED DESCRIPTION OF EMBODIMENTS

Figure 1:
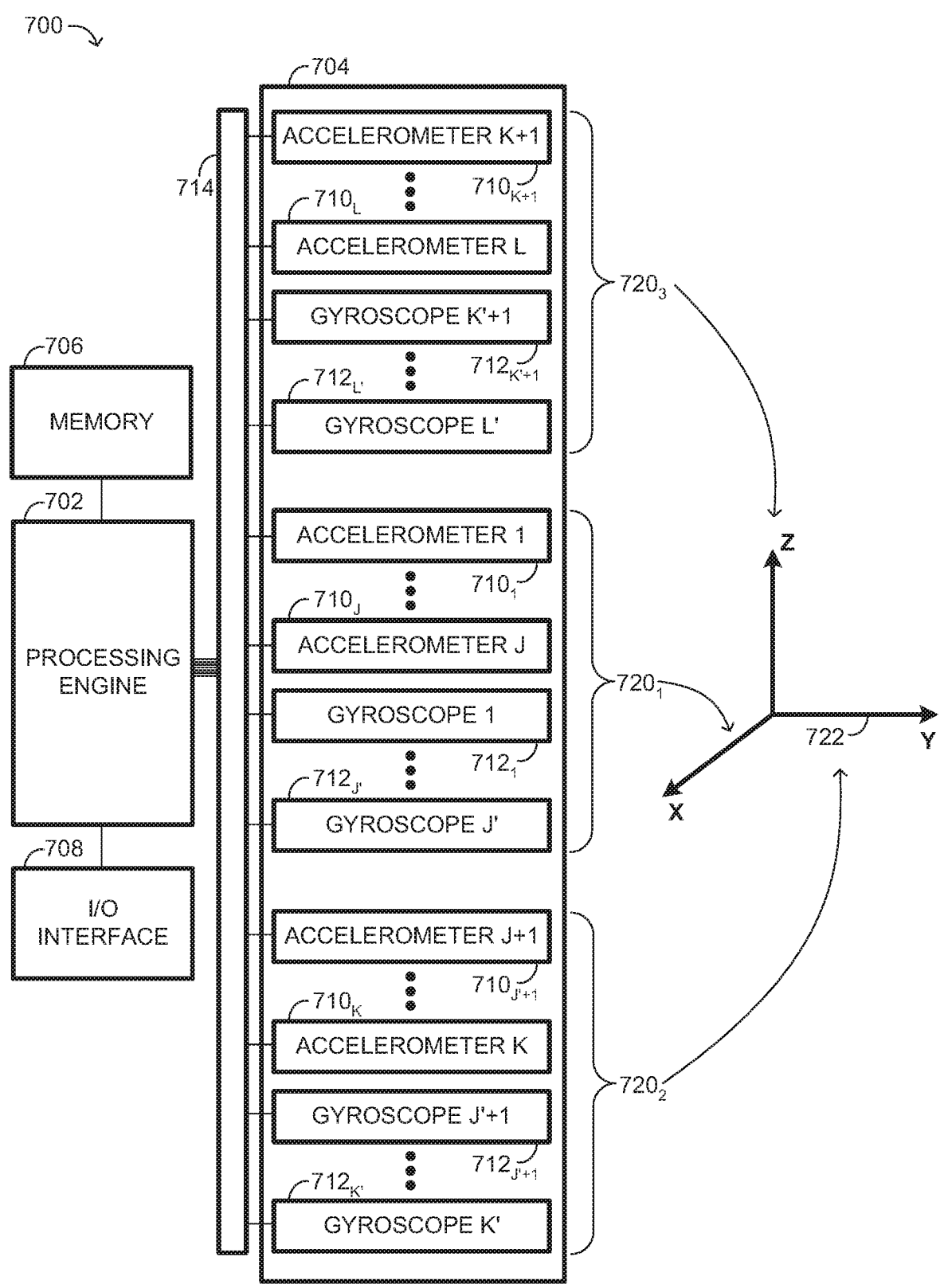
FIG. 1 is a top-level schematic diagram of a self-calibrating inertial measurement system, constructed and operative in accordance with another embodiment of the disclosed technique.

The disclosed technique provides an in-use self-calibrating inertial measurement system (IMS) and method for minimizing errors of an inertial measurement unit (IMU) associated with calibration and synchronization parameters. The IMU is typically subject to systematic errors as well as random errors. The IMU of the disclosed technique includes a plurality of inertial measurement sensors that are arranged in sensor clusters. Each sensor cluster includes several sensors in sufficient quantity that enables the system and method to reduce systematic errors and random errors. Random errors (random variations) are fluctuations in a measurement caused by random or unpredictable variations in the measurement instrument(s) or measurement process(es). Systematic errors (statistical biases) are reproducible inaccuracies that are consistent in a certain direction or tendency. The disclosed technique provides ways of minimizing both random and systematic errors by acquiring measurements from a redundant number of individual sensors in a sensor cluster, combining the measurements (individual outputs) to yield respective combined outputs, detecting which of the individual outputs diverges (deviates) from at least one of: (a) their inter-comparison, and (b) its respective combined output, according to a decision rule, and dynamically self-calibrating at least one parameter (associated with at least one outputted measurement). On the one hand, by combining the measurements (according to one implementation, e.g., via averaging) the disclosed system and method reduces the random error exhibited by the individual outputs. On the other hand, by combing the measurements and detecting divergences (e.g., from a value or range of values) the disclosed system and method is configured and operative to minimize a systematic error exhibited by at least one of the individual outputs by dynamically self-calibrating at least one parameter (e.g., associated with or that influences the diverging output). Essentially, the disclosed system and method is configured and operative to update (re-calibrate) (on-the-fly) the used parameters with re-calibrated new parameters, thus minimizing the systematic errors outputted from particular sensors that were detected to diverge.

The disclosed technique provides a self-calibrating inertial measurement system (IMS) and method that minimizes the influence of stray measurements outputted from particular inertial sensors (e.g., micro-inertial sensors) in a sensor cluster. Particularly, the IMS employs microelectromechanical system (MEMS) sensors (e.g., accelerometers, gyroscopes, magnetometers, pressure sensors, and thermometers, etc.) for measuring physical properties (e.g., acceleration, angular velocity and orientation, magnetic field strength, pressure, temperature, etc.). Although each MEMS sensor's instantaneous output typically exhibits noise as well sensitivity to external conditions (e.g., temperature, pressure, acoustic noise, acceleration fluctuations, magnetic field, electric field, etc.) the combined (e.g., averaged) output of several MEMS sensors provides a more accurate measurement in comparison to one MEMS sensor used alone. In order to accurately combine the measured physical properties of the MEMS sensors in a sensor cluster, all sensing elements require calibration.

The disclosed technique offers a solution to the "aging" problem experienced in MEMS sensors by providing a self-calibrating inertial measurement system (IMS) that generally includes at least one sensor cluster having a plurality of inertial sensors, and a processing engine. The inertial sensors are configured and operative to sample at least one of acceleration and angular velocity of at least one sensor cluster with respect to each axis in a plurality of axes of a reference frame, and for producing individual outputs associated with the acceleration and angular velocity. There are at least three inertial sensors that sample acceleration and angular velocity with respect to each same respective axis of the reference frame. The processing engine (e.g., a processor, group of processors) is configured and operative at least initially to receive the individual outputs, combine the individual outputs to yield a combined output, detect which of the individual outputs diverges from at least one of their inter-comparison (i.e., mutual comparison between individual outputs so as to determine divergence, e.g., by comparing inter-relational individual outputs), and its respective combined (e.g., a majority of outputs) output according to a decision rule with respect to at least one feature (e.g., a specific attribute in the data corresponding to the individual outputs, a criterion such as a threshold, and the like). The processing engine is configured during operation of the IMS to dynamically self-calibrate at least one of: individual scale factor of those inertial sensors whose individual outputs were detected to diverge, by respectively applying individual gain corrections; individual cross-axis sensitivity of inertial sensors whose individual outputs were detected to diverge, by respectively applying individual cross-axis corrections; and individual bias of those inertial sensors whose individual outputs were detected to diverge, by respectively applying individual bias corrections. The principles of the disclosed technique apply to different kinds of inertial sensors, such as MEMS ("micro-inertial"), accelerometers, gyroscopes, fiber-optic gyroscopes (FOGs), and the like.

To describe the disclosed technique in greater detail, reference is now made to FIG. 1, which is a top-level schematic diagram of a self-calibrating inertial measurement system, generally referenced 700, constructed and operative in accordance with another embodiment of the disclosed technique. Inertial measurement system (IMS) 700 includes a processing engine 702, a sensor cluster 704, a memory 706, and an input/output (I/O) interface 708. Sensor cluster 704 includes a plurality of sensors, specifically, accelerometers $710_1$, $710_2$, . . . , $710_J$, $710_{J+1}$, . . . , $710_K$, $710_{K+1}$, . . . , $710_L$, and gyroscopes $712_1$, $712_2$, . . . , $712_{J'}$, $712_{J'+1}$, . . . , $712_{K'}$, $712_{K'+1}$, . . . , $712_L$. (where J, K, and L are integers such that $3 \leq J+1 < K$ and $K+1 < L$ and the same applies to primed indices J', K', and L'). For other types of sensors (e.g., temperature, pressure, magnetic field sensors, there is at least one of each type (not shown). The disclosed technique is implementable according to various sensor configurations. In accordance with a simple sensor configuration, each sensor (accelerometer, gyroscope, etc.) includes one element that is configured and operative to measure a physical property (e.g., acceleration, orientation) with respect to a single axis. According to a more typical and general sensor configuration of the disclosed technique, each sensor includes multiple sensing elements (e.g., a sensor triad) operative to measure a physical property with respect to multiple axes. For example, according to a typical implementation of the disclosed technique, each sensor includes at least three sensor elements operative to measure a physical property with respect to at least three respective axes. The description hereinbelow first details the simple sensor configuration, and thereafter reference will be made to the general sensor configuration with regard to the differences between the two configurations, as for the principles of operation of the disclosed technique are substantially the same for both sensor configurations.

Processing engine 702 is coupled with sensor cluster 704 (e.g., via a data bus 714), memory 706, and with I/O interface 708. In particular, each accelerometer and gyroscope is coupled with processing engine 702. Alternatively, sensor cluster 704 is coupled remotely (e.g., non-physically) with processing engine 702. The accelerometers and gyroscopes may be grouped in sensor groups $720_1$, $720_2$, and $720_3$ according to a relationship with a reference frame 722 that is associated with inertial measurement system 700. Reference frame 722 includes a plurality of axes X, Y, and Z. Without loss of generality, reference frame 722 shown in FIG. 1 is represented by a three-dimensional (3-D) Cartesian coordinate system, whose axes X, Y, and Z are orthogonal to one another. Alternatively, other types of coordinate systems may be used with the principles of the disclosed technique (e.g., non-orthogonal or skewed coordinate system, etc.). Each one of the accelerometers and gyroscopes shown in FIG. 1 are sensor elements or constituents that form separate units of multi-dimensional sensors. For example, a typical configuration of the disclosed technique, there are at least three sensor elements, which make up an individual physical sensor. A 3-axis (or 3-dimensional (3-D) physical accelerometer sensor having three sensor elements would include, for example accelerometers $710_1$, $710_{K+1}$, and $710_{J+1}$. Similarly, a 3-axis gyroscope sensor includes, for example gyroscopes $712_1$, $712_{K'+1}$, and $712_{J'+1}$. Sensors $710_1$, $710_2$, . . . , $710_J$, $710_{J+1}$, . . . , $710_K$, $710_{K+1}$, . . . , $710_L$, $712_1$, $712_2$, . . . , $712_{J'}$, $712_{J'+1}$, . . . , $712_{K'}$, $712_{K'+1}$, . . . , $712_L$, of sensor cluster 704 are in general arbitrarily oriented with respect to reference frame 722. All sensors may be aligned to one coordinate system via a calibration procedure that will be detailed hereinbelow. Particularly, for the purposes of elucidating the principles of the disclosed technique it is assumed that a preliminary calibration procedure has been performed and each sensor having multiple sensing elements is associated with a common coordinate system. The inertial sensors are also respectively associated with calibration parameters and synchronization parameters. For the sake of the example, it is selected that sensor group $720_1$ is associated with the X-axis, sensor group $720_2$ is associated with the Y-axis, and sensor group $720_3$ is associated with the Z-axis of reference frame 722, as representatively shown in FIG. 1.

Sensor group $720_1$ includes accelerometers $710_1$, . . . , $710_J$ and gyroscopes $712_1$, . . . , $712_{J'}$. Accelerometers $710_1$, . . . , $710_J$ are each configured and operative to measure (i.e., sample) (proper) acceleration of sensor cluster 704 along the X-axis, and to produce respective outputs in response to sensed acceleration. Gyroscopes $712_1$, . . . , $712_{J'}$ are each configured and operative to measure angular velocity ("angle rate") of sensor cluster 704 about the X-axis, and to produce respective outputs. Similarly, sensor group $720_2$ includes accelerometers $710_{J+1}$, . . . , $710_K$ and gyroscopes $712_{J'+1}$, . . . , $712_{K'}$. Accelerometers $710_{J+1}$, . . . , $710_K$ are each configured and operative to measure acceleration of sensor cluster along the Y-axis, and to produce respective outputs in response to sensed acceleration. Gyroscopes $712_{J'+1}$, . . . , $712_{K'}$ are each configured and operative to measure angular velocity of sensor cluster 704 about the Y-axis, and to produce respective outputs. Further similarly, sensor group $720_3$ includes accelerometers $710_{K+1}$, . . . , $710_L$ and gyroscopes $712_{K'+1}$, . . . , $712_L$. Accelerometers $710_{K+1}$, . . . , $710_L$ are each configured and operative to measure acceleration of sensor cluster along the Z-axis, and to produce respective outputs in response to sensed acceleration. Gyroscopes $712_{K'+1}$, . . . , $712_L$ are each configured and operative to measure angular velocity of sensor cluster 704 about the Z-axis, and to produce respective outputs. In a typical preferred configuration of inertial measurement system 700, there are at least three sensors of each type (i.e., accelerometer, gyroscope) in each sensor group that is associated with a respective axis. In addition, IMS 700 may include at least one auxiliary sensor (e.g., temperature sensor, pressure sensor, magnetic field sensor, etc.) for sampling an auxiliary physical property (respectively, i.e., temperature, pressure, magnetic field, etc.) in conjunction with the sampling of acceleration and angular velocity, thereby producing respective auxiliary physical property measurement (respectively, i.e., temperature measurement, pressure measurement, magnetic field measurement, etc.).

According to an example configuration, each sensor has associated therewith a respective temperature sensor (i.e., an auxiliary sensor—not shown) for measuring its temperature. Specifically, for each individual sensor output $x_i$ has associated therewith a corresponding temperature measurement $T_i$ acquired at a particular time $t_i$. Memory 706 is configured and operative to store the individual sensor outputs $x_i$ and their associated temperature measurements $T_i$ at their corresponding time measurement points $t_i$ (e.g., a triplet ($x_i$, Ti, $t_i$)). According to one implementation, each sensor is coupled (e.g., thermally) with a respective temperature sensor. According to another implementation, not every sensor is coupled with its respective temperature sensor (e.g., neighboring temperature sensors of other sensors are utilized).

As noted hereinabove, according to one simple sensor configuration each sensor is a sensing element for measuring a physical property (e.g., acceleration, angular velocity, magnetic field, etc.) with respect to a particular axis (after calibration thereof). According to a preferred sensor configuration, each sensor is essentially a "multi-sensor" that includes multiple sensing elements for measuring a physical property (e.g., acceleration, angular velocity, etc.) with respect to multiple axes. For example, a 3-axis accelerometer (multi-sensor) including a triad of sensing elements for sensing acceleration with respect to three (e.g., mutually orthogonal) axes (e.g., 3-D (three dimensions)). According to this sensor configuration, accelerometer $710_1$, accelerometer $710_{K+1}$, and accelerometer $710_J$ are three distinct sensing elements (a sensor triad) that constitute a single 3-axis (physical) accelerometer sensor. Similarly, gyroscope $712_1$, gyroscope $712_{J+1}$, and gyroscope $712_{K'+1}$ are three distinct sensing elements (a sensor triad) that constitute a single 3-axis (physical) gyroscope sensor. The same logic applies to the other accelerometers and gyroscopes of FIG. 1 (e.g., accelerometer triads $710_2$, $710_{J+2}$, $710_{K+2}$, . . . , $710_J$, $710_K$, $710_{K'}$, and gyroscope triads $712_2$, $712_{J+2}$, $712_{K'+2}$, . . . , $712_{J'}$, $712_{K'}$, $712_{K''}$. Alternatively, the principles of the disclosed technique similarly apply to other sensor configurations having other multiples of sensing elements (e.g., quadruple sensor for measuring a physical property with respect to four axes or "coordinate element", etc.) (not shown).

Processing engine 702 is generally configured and operative to receive the outputs from the accelerometers and gyroscopes of sensor cluster 704, and to process those outputs, as will be described in greater detail hereinbelow. Processing engine 702 is typically embodied in the form of a processing unit having at least one processor. Alternatively, processing engine 702 is a distributed computing system having multiple distinct processing units (e.g., communicating via a computer communication network, etc.).

Memory 706 is generally configured and operative to store at least part or form of these outputs from sensor cluster 704. Memory 706 is generally configured and operative to store all data in all phases in the operation of the system and method of the disclosed technique (were required), such as raw data from the individual sensors of sensor cluster 704, processed data from processing engine 702, combined outputs, re-calibration parameters (error corrections), and the like. Memory 706 is typically embodied in the form of volatile memory (e.g., random-access memory (RAM), etc.), non-volatile memory (e.g., read-only memory (ROM), flash memory, hard disk drives, solid-state drives, ferroelectric RAM (F-RAM), etc.), and the like.

I/O interface 708 is generally configured and operative to communicate data to-and-fro to external devices (e.g., auxiliary devices, such as an external INS), as well as to receive input from a user of inertial measurement system 700. I/O interface 708 typically includes at least one communication module (not shown) for communicating with at least one external device, such as satellite navigation systems (e.g., Global Positioning System (GPS)), an aircraft's INS, etc.) and supplementing inertial measurement data produced by sensor cluster 704. Processing engine 702 is further configured to receive auxiliary external data from at least one external device such as an external INS, a satellite navigation system, another sensor cluster, an external calibration device, a computer, and an input/output (I/O) interface (e.g., a user interface).

I/O interface 708 may further include a user interface (not shown) such as a human-machine interface (HMI), for communicating information, such as results, instructions, feedback, and the like.

Figure 2:
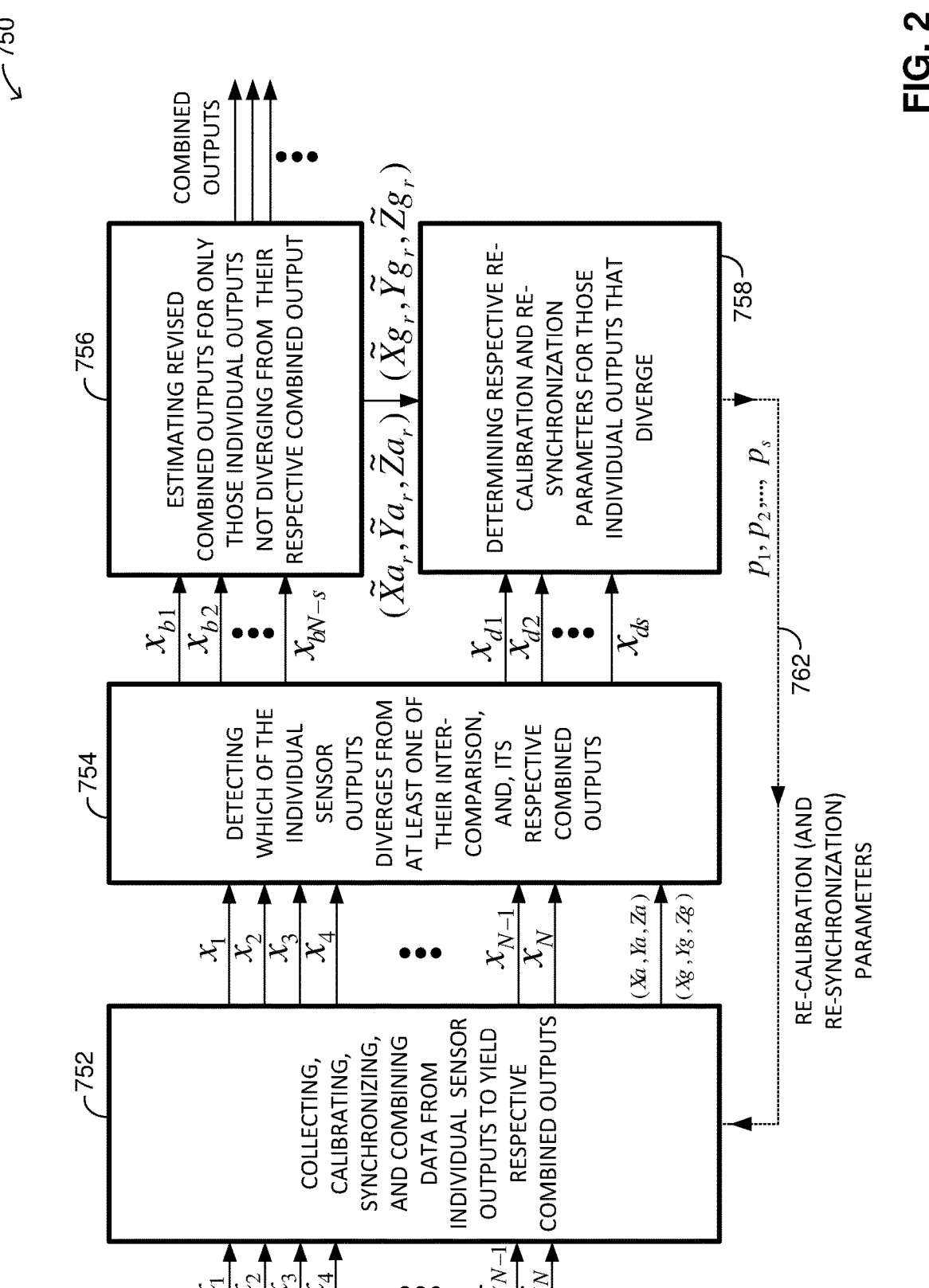
FIG. 2 is a schematic diagram of a data processing scheme, constructed and operative in accordance with the embodiment of the disclosed technique.

To further elucidate the particulars of the disclosed technique, reference is now further made to FIG. 2, which is a schematic diagram of a data processing scheme, generally referenced 750, constructed and operative in accordance with the embodiment of the disclosed technique. FIG. 2 illustrates a data processing scheme including several phases that are implemented by processing engine 702 (FIG. 1), where a plurality of N sensor outputs $x_1$, $x_2$, $x_3$, $x_4$, . . . , $x_{N-1}$, $x_N$ (where N is a positive integer) from sensor cluster 704 are inputted to processing engine 702. Sensor outputs $x_1$, $x_2$, $x_3$, $x_4$, . . . , $x_{N-1}$, $x_N$ each represents an individual output from the individual accelerometers and gyroscopes (FIG. 1) of sensor cluster 704. In the following description it is assumed that there are a total of N accelerometers and gyroscopes in sensor cluster 704 (i.e., N different sensor outputs corresponding to N distinct sensors).

In a preliminary (processing) phase 752, processing engine 702 collects, calibrates, synchronizes, and combines data (e.g., in the form of signals) from individual sensor outputs $x_1$, $x_2$, $x_3$, $x_4$, . . . , $x_N$, $x_N$ so as to yield combined outputs corresponding to each axis X, Y, Z: Xa, Ya, Za and Xg, Yg, Zg (where suffixes 'a' and 'g' respectively denote accelerometers and gyroscopes). Each sensor output (i.e., in the form of a signal, data) includes a unique identifier (not shown) with which processing engine 702 can identify the sensor corresponding thereto. Processing engine 702 is configured and operative to collect and apply calibration to each of the sensors so to associate each sensor element to a particular axis of reference frame 722 (i.e., of a mutual coordinate system). In particular, for a sensor (e.g., a 3-axis sensor having three sensing elements), an arbitrary non-calibrated state entails that each sensor element's output can be dependent on at least two orthogonal axes of the reference frame (i.e., apart from the special case of exact sensor element alignment to a particular axis). A calibrated state entails associating each sensor element to a particular axis of a reference frame. Application of initial calibration parameters may be based on default calibration data (e.g., stored in memory 706), manufacturer data (corresponding to each of the sensors), an external (offline) calibration device (e.g., a shaker vibration table), and the like.

Synchronizing generally involves affecting a correspondence such that different individual outputs are time-wise correlated. Practically, processing engine 702 selects a common time-base for which the outputs of the sensors are synchronized to. For example, a time-keeping device (e.g., clock, oscillator) is used (not shown) for facilitating synchronization. Alternatively, processing engine selects a particular inherent frequency of one of the sensors as a common time-base for the rest of the sensors.

Combining generally involves at least one of merging, averaging, filtering (e.g., Kalman filter), fusing, intermixing, and uniting the individual sensor outputs into at least one combined output. According to one implementation, each combined output Xa, Ya, Za, Xg, Yg, Zg is a weighted average of the individual sensor outputs of a particular sensor type (e.g., accelerometer, gyroscope, magnetometer, etc.) that is associated with a particular axis. Thus, Xa denotes a combined sensor output of accelerometers $710_1$, . . . , $710_J$ in sensor group $720_1$ (FIG. 1) that are operative to measure acceleration along the X-axis. Likewise, Xg denotes a combined sensor output of gyroscopes $712_1$, . . . , $712_{J'}$ in sensor group $720_1$ that are operative to measure angle rate about the X-axis. Similar logic applies to Ya, Za, Xg, Yg and Zg. The combined outputs Xa, Ya, Za, Xg, Yg, Zg are produced, in accordance with one exemplary implementation, according to the following equations:

$$Xa = \sum_{i}^{J} \alpha_{X_i}^{a} x_i, \tag{1}$$

$$Ya = \sum_{i}^{K-(J+1)} \alpha_{Y_i}^{a} x_i, \tag{2}$$

$$Za = \sum_{i}^{L-(K+1)} \alpha_{Z_i}^{a} x_i, \tag{3}$$

$$Xg = \frac{1}{J'} \sum_{i}^{J'} \alpha_{X_i}^{g} x_i, \tag{4}$$

$$Yg = \sum_{i}^{K'-(J'+1)} \alpha_{Y_i}^{g} x_i, \tag{5}$$

$$Zg = \sum_{i}^{L'-(K'+1)} \alpha_{Z_i}^{g} x_i, \tag{6}$$

where $x_i$ generically represents the i-th measurement outputted from an i-th sensor in the respective sensor group, i represents an integer running index, and $\alpha_{X_i}^{a}$, $\alpha_{Y_i}^{a}$, $\alpha_{Z_i}^{a}$, $\alpha_{X_i}^{g}$, $\alpha_{Y_i}^{g}$, and $\alpha_{Z_i}^{g}$ represent coefficients of an i-th sensor of a particular sensor group (indicated by subscripts 'X' for sensor group $720_1$, 'Y' for sensor group $720_2$, and 'Z' for sensor group $720_3$) of a particular type (indicated by superscripts 'a' and 'g'). The coefficients typically depend on known character-istics of each sensor, such as the dynamic range of the output, a calculated reliability measure of that sensor (e.g., which depends on intrinsic noise characteristics and mismatched (or inconsistent) measurements in a recent measurement time record). Combining data from individual outputs according to equations (1)-(6) assumes calibration has been applied (with respect to a common reference frame 722). In the typical imple-mentation, the coefficients are per sensor (e.g., $\alpha_{x1}^{a}=\alpha_{y1}^{a}=a_{z1}^{a}$ and so forth). According to another implementation, combining involves fusing data from individual outputs acquired from sensors of different type (e.g., between at least two sensor types such as acceleration sensors, gyroscopic sensors, and magnetic field sensors) by using for example, Kalman filtering (i.e., executed by processing engine 702).

In a phase 754, processing engine 702 is configured and operative to detect which of individual sensor outputs $x_1$, $x_2$, $x_3$, $x_4$, . . . , $x_{N-1}$, $x_N$ diverges from at least one of: (a) their inter-comparison (i.e., mutual comparison between indi-vidual sensor outputs so as to determine divergence within the group of N individual sensor outputs, and (b) its respec-tive combined output. Specifically, for each sensor output of a particular sensor group of a particular type, processing engine 702 detects which at least one sensor output (e.g., a 3D-vector calibrated sensor output) diverges from its respec-tive combined output. For example, suppose that acceler-ometers $710_1$, . . . , $710_J$ in sensor group $720_1$ produce corresponding outputs $x_1$, . . . , $x_J$. Processing engine 702 detects which of these J outputs diverge from combined output Xa given in equation (1), according to a predeter-mined decision rule (e.g., fuzzy logic). The decision rule defines if and how a particular measurement or output diverges from its respective combined output according to a set of rules. An example of a simplistic decision rule is a binary rule that involves a set threshold, whereupon a measurement or output that surpasses this threshold would be considered as diverging. In accordance with the above-mentioned example, if processing engine 702 detects that a particular output deviates from its corresponding combined output when it surpasses a set threshold, then processing engine 702 identifies and classifies that output as diverging. Processing engine 702 is configured and operative to detect divergences by inter-comparing the individual sensor out-puts among themselves (e.g., via comparison algorithms).

With respect to processing the entire N individual outputs, processing engine 702 is configured and operative to detect which of the individual outputs $x_1$, $x_2$, $x_3$, $x_4$, . . . , $x_{N-1}$, $x_N$ diverges from its respective combined outputs according to whether or not they are the minority or majority. According to one option, processing engine 702 determines ("decides") that a majority of non-diverging individual outputs represent more consistent and dependable outputs, with respect to the minority of diverging individual outputs. According to another option, processing engine 702 determines that a minority of non-diverging individual outputs represent the more consistent and dependable outputs, than the majority of diverging individual outputs. In this latter option, pro-cessing engine 702 typically employs additional criteria such as sensor reliability in the evaluation of whether or not to weigh more (e.g., via weighing coefficients) in favor of the non-diverging minority of individual sensor outputs than of the diverging majority of individual sensor outputs. For example, in case external devices (e.g., sensors, optical trackers, external INS, satellite navigations system, etc.) are considered to output relatively more reliable measurements compared with at least part of the N individual sensor outputs, they can be used by processing engine 702 to evaluate their impact.

To further explicate the particulars of phase 754 (and subsequent phases), reference is now further made to FIG. 3, which is a schematic diagram illustrating divergence detec-tion of a sensor output from its corresponding combined output in a particular sensor group and type, generally referenced 780, constructed and operative in accordance with the embodiment of the disclosed technique. Without loss of generality, a particular sensor group of a particular type is selected for explicating the particulars of this phase of the disclosed technique. The principles brought forth likewise apply to other sensor groups, and types. Further-more, the principles of the disclosed technique is analo-gously applicative to a plurality of sensors each respectively and substantially simultaneously diverging from its respec-tive combined output, provided that the number of diverging sensors are a minority with respect to the total number of sensors (i.e., less than 50% of N). FIG. 3 illustrates a plurality of J sensor output graphs $782_1$, $782_2$, $782_3$, . . . , $782_J$ respectively corresponding to sensor outputs $x_1$, . . . , $x_J$ of accelerometer sensors $710_1$, . . . , $710_J$ (that processing engine 702 receives) in sensor cluster $720_1$ (FIG. 1). Sensor output graphs $782_1$, $782_2$, $782_3$, . . . , $782_J$ are shown as a function of time (t). Alternatively, the sensor outputs may be expressed in conjunction with other variables, e.g., tempera-ture, etc. (not shown). A multiple graph 784 includes indi-vidual sensor output graphs $782_1$, $782_2$, $782_3$, . . . , $782_J$ as well as a graph of the combined output Xa (determined according to equation (1)). Processing engine 702 detects which individual sensor output (e.g., sensor output $x_3$) deviates from combined output Xa according to a decision rule (e.g., a threshold function). A multiple graph 786 includes sensor output graph 782$_3$ (i.e., of sensor output $x_3$ shown isolated with respect to the other individual sensor output graphs), combined output Xa, and a threshold function that is represented in FIG. 3 as an upper threshold graph 788, denoted interchangeably as "thres.$^+$". Processing engine 702 detects that sensor output $x_3$ deviates from Xa and surpasses an upper threshold function 788 (which constitutes as a decision rule) by an amount Δthres.$^+$ (as denoted in FIG. 3 "Δthres.$^+$ $x_3(t_0)$"). Δthres.$^+$ $x_3(t_0)$ signifies a difference between upper threshold function 788 and sensor output $x_3$ at specific time point $t_0$. Analogously, there can be also defined a lower threshold function thres.$^-$ (not shown in FIG. 3). Once processing engine 702 detects that an individual sensor output (e.g., $x_3$) deviates from its corresponding combined output, and concurrently satisfies the conditions of the decision rule, processing engine 702 identifies and classifies that output (e.g., $x_3$) as diverging. In the case presented above there was one sensor output (i.e., $x_3$) being identified and classified as diverging, however, the disclosed technique is similarly applicable in cases where multiple sensor outputs are detected, identified, and classified as being diverging. FIG. 2 demonstrates a general situation where s individual sensor outputs where detected to diverge from their respective combined outputs (s representing a positive integer between 0 and N), and N−s individual sensor outputs where not detected to diverge from their respective combined outputs. Accordingly, the s individual sensor outputs designated by $x_{d_1}, x_{d_2}, \ldots, x_{d_s}$ are diverted to processing phase 758, whereas N−s individual sensor outputs designated by $x_{b_1}, x_{b_2}, \ldots, x_{b_{N-s}}$ are diverted to processing phase 756.

Generally, processing engine 702 is configured and operative to estimate revised combined outputs to at least part of the individual outputs. According to a particular case, in a phase 756, processing engine 702 is configured and operative to estimate a revised combined output from only those individual outputs not diverging from their respective combined output. In case of multiple individual outputs in different sensor groups and/or types, processing engine 702 is configured and operative to estimate revised combined outputs for each sensor group of each type. Specifically, in any sensor group of a particular type there may be individual sensor outputs that were detected as diverging from their respective combined outputs. For those sensor outputs in a particular sensor group and sensor type, not detected as diverging from their respective combined output, processing engine 702 estimates a revised combined output. Alternatively, processing engine 702 is configured and operative to estimate revised combined outputs for each sensor group for all outputs (i.e., including those outputs diverging from their respective combined output) by adjusting (i.e., decreasing) the weights (i.e., coefficient values) corresponding to those diverging outputs, thus reducing their contribution to their respective combined outputs.

Figure 4:
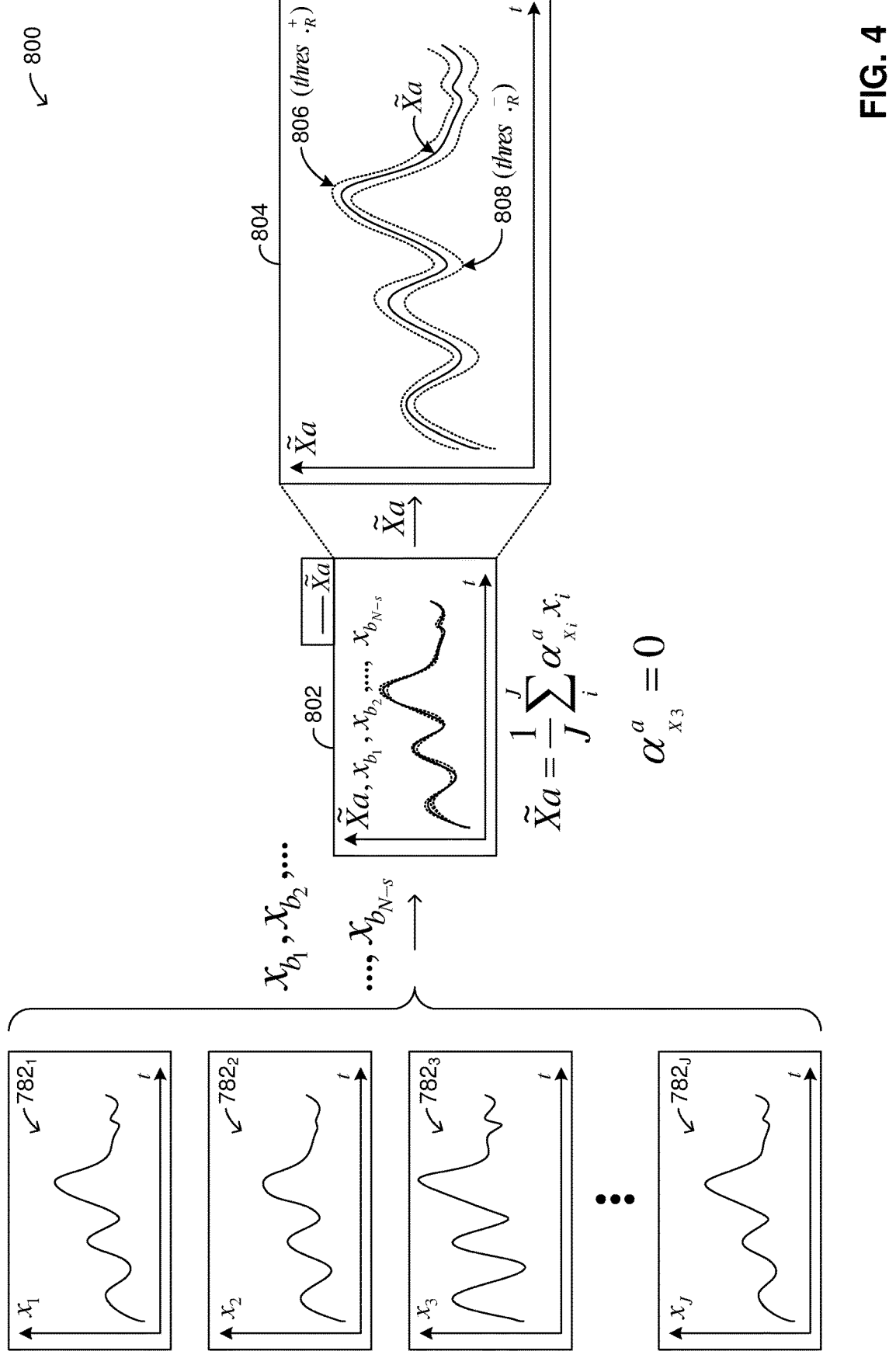
FIG. 4 is a schematic diagram illustrating estimation of a revised combined output from those individual outputs not diverging from their corresponding combined output in a particular sensor group and type, constructed and operative in accordance with the embodiment of the disclosed technique.

To further explicate the particulars of phase 756 (and subsequent phases), reference is now further made to FIG. 4, which is a schematic diagram illustrating estimation of a revised combined output from those individual outputs not diverging from their corresponding combined output in a particular sensor group and type, generally referenced 800, constructed and operative in accordance with the embodiment of the disclosed technique. FIG. 4 illustrates N−s individual sensor outputs $x_{b_1}, x_{b_2}, \ldots, x_{b_{N-s}}$ (excluding sensor output $x_3$) being processed to estimate a revised combined output. Processing engine 702 estimates a revised combined output Xa by excluding the contribution of sensor output $x_3$ to X̃a (e.g., by setting its respective coefficient $\alpha_{x_3}^a$ to zero). Revised combined output X̃a is graphically shown in a multiple graph 802 along with graphs of individual sensor outputs $x_{b_1}, x_{b_2}, \ldots, x_{b_{N-s}}$. Following, or simultaneously to the estimation of revised combined output X̃a, processing engine 702 may optionally modify the decision rule (i.e., dynamic decision rule) applied to the revised combined output. For example, as representatively depicted in FIG. 4, a multiple graph 804 shows revised combined output X̃a, a revised upper threshold function graph 806 (denoted interchangeably as thres.$_R^+$, and a revised lower threshold function graph 808 (denoted interchangeably as thres.$_R^+$.

In a phase 758, processing engine 702 is configured and operative to determine respective re-calibration parameters and re-synchronization parameters for those individual outputs detected to diverge (from at least one of: (a) their inter-comparison; and (b) their respective combined output). Specifically, processing engine 702 determines re-calibration parameters (corrections) and re-synchronization parameters (if applicable) for those sensors whose individual sensor outputs in each sensor group of a particular type were detected as diverging from their respective combined output (phase 754). To determine the re-calibration parameters, processing engine 702 is configured and operative to seek the errors that currently are (i.e., during use) and also were involved in the divergence of each individual sensor output from its respective output. For example, processing engine 702 is configured and operative to search for and determine various errors that affected the divergence of sensor output $x_3$ from its respective combined output Xa. As will be elaborated hereinbelow, once the errors that affected the divergence are identified, processing engine 702 is configured and operative to determine (e.g., calculate) appropriate corrections (re-calibration parameters) for those errors and apply the corrections to those individual outputs detected to diverge.

Figure 5:
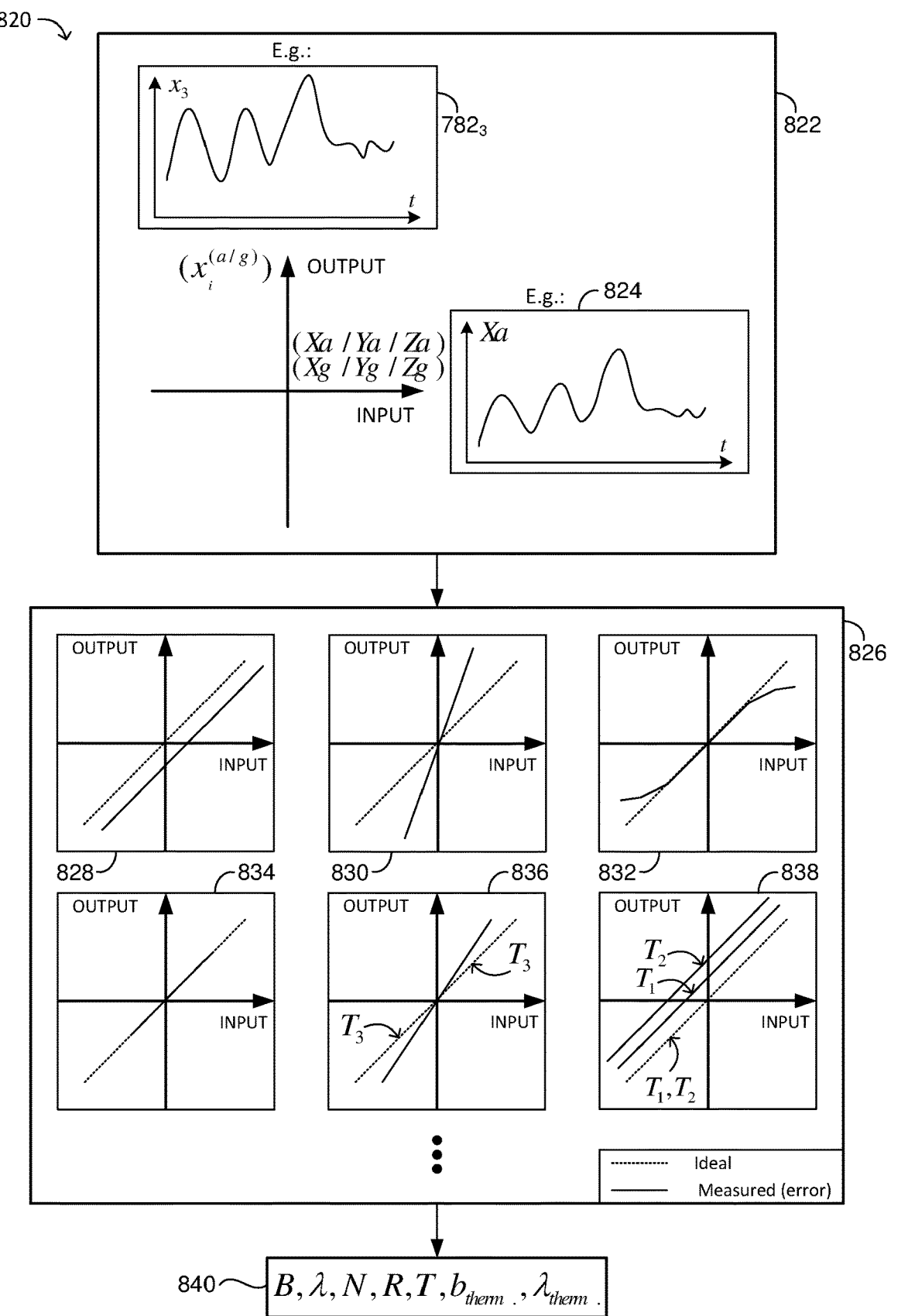
FIG. 5 is a schematic illustration diagrammatically showing aspects in the determination of various errors, constructed and operative in accordance with the embodiment of the disclosed technique.

To elucidate the particulars of phase 758, reference is now further made to FIG. 5, which is a schematic illustration diagrammatically showing aspects in the determination of various errors, generally referenced 820, constructed and operative in accordance with the embodiment of the disclosed technique. According to the disclosed technique, apart from random errors, several systematic errors may transpire during operation of IMS 700 that may affect the measurement outputs of the sensors. Systematic errors include (and not limited to) namely, scale factor (gain), cross-axis sensitivity, constant bias (e.g., zero-bias), mutual alignment of the sensors, thermal bias, thermal gain, non-linearity, gyroscopic inertial bias, and the like. To determine the re-calibration parameters for a particular sensor whose individual output was determined to diverge (e.g., sensor output $x_3$) processing engine 702 assesses whether the aforementioned errors can correct for the divergence. Without loss of generality, the example given in FIG. 5 relates to the detected divergence of individual sensor output $x_3$, in phase 754). Determination of the re-calibration parameters involves determining of a calibration function for each sensor (i.e., multi-sensor, e.g., a 3-D sensor) separately (described in greater detail hereinbelow) that generally relates an input with a single output. According to a particular implementation of the disclosed technique, the input is a combined output of a particular sensor group of particular type, i.e., one of: Xa, Ya, Za, Xg, Yg, Zg (e.g., Xa, represented by combined output graph 824), whilst the output is its corresponding raw individual sensor output, i.e., an $x_i$ (e.g., $x_3$, represented by sensor output graph 782$_3$), as shown diagrammatically in block 822 of FIG. 5.

Generally, processing engine 702 of IMS 700 assesses (during operation of IMS 700) a range of various possible systematic errors (shown diagrammatically in block 826 of FIG. 5) that may have caused a sensor output (or plurality thereof) to diverge from its respective combined output. Specifically, processing engine 702 assesses whether or not there is a bias error (diagrammatically represented by subblock 828), as well as its extent (i.e., quantity, magnitude, value), according to the following bias error model:

$$x(t) = W(t) + B + \xi(t) \tag{7},$$

where x(t) is the measurement output of a particular sensor in a particular sensor group of a particular type (e.g., output $x_1$ in sensor group $720_1$, of type accelerometer $710_1$), dependent on time (t), W(t) generally represents a measured physical property (e.g., acceleration, orientation), B represents the bias error of the particular sensor, and $\xi(t)$ generally represents the noise of a measurement (measurement error). In addition, processing engine 702 assesses whether or not there exists a gain error (diagrammatically represented by subblock 830), as well as its extent, according to the following scale factor error model:

$$x(t) = N\Lambda \cdot W(t) + \xi(t) \tag{8},$$

where $\lambda$ represents the scale factor error. The scale factor error may also be expressed as: $\lambda = (\lambda_1, \lambda_2, \lambda_3)$ and $\Lambda = \text{diag}(\lambda)$. In more general terms a gain error may be expressed as a gain matrix in the form: $S = N\Lambda$, where N is a non-orthogonality compensation matrix (error between different MEMS axes (X, Y, Z) of a particular sensor that measures various physical properties such as acceleration, rotational velocity, magnetic field strength, and the like), and $\Lambda$ is the scale factor error. (Persons skilled in the art would readily recognize that matrix N is not to be confused with the number of inertial sensors index N). In addition, processing engine 702 assesses whether or not there exists a non-linearity error (diagrammatically represented by subblock 832) for each axis and its extent, according to the following non-linearity error model (may be expressed as a triplet of nonlinear functions applied element-wise):

$$x(t) = \text{diag}(NL(W(t))) \cdot W(t) + \xi(t) \tag{9},$$

where $NL$, represents a non-linearity error. Further additionally, processing engine 702 assesses whether or not there exists a mutual alignment (mutual frame orientation) error (diagrammatically represented by subblock 834) between sensors of each type (e.g., gyroscopes, accelerometers, magnetometers), and its extent, according to the following mutual alignment error model:

$$x(t) = R \cdot W(t) + \xi(t) \tag{10},$$

where R represents an alignment error (i.e., with respect to a coordinate system, reference frame 722). Further additionally, processing engine 702 assesses whether or not there exists a time synchronization error T between individual sensors (i.e., sensor elements) in a particular sensor cluster and/or between several sensor clusters (not shown) each having a multitude of inertial measurement sensing elements (sensors), according the following time synchronization error model:

$$x(t) = W(t+T) + \xi(t+T) \tag{11}.$$

Further additionally, processing engine 702 assess whether or not there exists a thermal gain error $\lambda_{therm.}$ (diagrammatically represented by subblock 836), as well as a thermal bias error $b_{therm.}$ (diagrammatically represented by subblock 838) by evaluating if there exists a statistically significant correlation (over time) between an individual sensor output and its corresponding temperature measurement (not shown) that is outputted by its respective temperature sensor. According to one implementation, statistical analysis is performed by searching (in recent past sensor data, e.g., stored in memory 706) for statistically significant correlation(s) of rapid changes in gain, bias and non-orthogonality that coincide with temperature changes. An example of such data is represented in Table 1.

TABLE 1

An example association of bias data and temperature data for determining statistical correlation therebetween.

| Date &Time | Temperature | Bias (X axis) | Bias (Y axis) | Bias (Z axis) |
|---|---|---|---|---|
| 20161101152311 | 18.2° C. | 0.1 | −0.1 | 0.1 |
| 20161101162647 | 21.5° C. | 0.15 | −0.15 | 0.1 |
| 20161101185739 | 24.3° C. | 0.18 | −0.18 | 0.12 |
| . . . | . . . | . . . | . . . | . . . |

In an analogous manner, statistically significant correlations are determined for other parameters (e.g., B, $\lambda$, N, R). To facilitate determination of errors B, $\lambda$, N, R, and T, for each individual sensor, processing engine 702 employs a sensor-specific calibration function that can be approximated by an affine function having the general (matrix) form:

$$\begin{pmatrix} x_i^{(P)} \\ y_i^{(P)} \\ z_i^{(P)} \end{pmatrix} = \begin{pmatrix} C_{11} & C_{12} & C_{13} \\ C_{21} & C_{22} & C_{23} \\ C_{31} & C_{32} & C_{33} \end{pmatrix}_i^{(P)} \cdot \begin{pmatrix} X_{(P)} \\ Y_{(P)} \\ Z_{(P)} \end{pmatrix} + \begin{pmatrix} B_x \\ B_y \\ B_z \end{pmatrix}_i, \tag{12}$$

where:

$$\begin{pmatrix} x_i^{(P)} \\ y_i^{(P)} \\ z_i^{(P)} \end{pmatrix}$$

represents a 3-axis individual output (associated with motion and/or orientation) of a particular i-th sensor of a particular type (i.e., measuring a particular physical property (P) such as acceleration (substituting '(P)=a'), orientation and/or rotational velocity (substituting '(P)=g'), magnetic field strength (substituting '(P)=m'), etc.);

matrix $$C = \begin{pmatrix} C_{11} & C_{12} & C_{13} \\ C_{21} & C_{22} & C_{23} \\ C_{31} & C_{32} & C_{33} \end{pmatrix}_i^{(P)}$$

represents a calibration matrix of a particular i-th sensor measuring the physical property (P);

$$\begin{pmatrix} X_{(P)} \\ Y_{(P)} \\ Z_{(P)} \end{pmatrix}$$

represents a measured physical property (e.g., acceleration, orientation) by the sensor for the various (3) axes; and $$B = \begin{pmatrix} B_x \\ B_y \\ B_z \end{pmatrix}_i;$$

represents the 3-axis bias error for the i-th sensor.

Processing engine 702 employs the calibration function to solve for errors B, S, NL, R, and T, and according to a particular implementation, processing engine 702 sets $$\begin{pmatrix} X_{(P)} \\ Y_{(P)} \\ Z_{(P)} \end{pmatrix} = \begin{pmatrix} \tilde{X} \\ \tilde{Y} \\ \tilde{Z} \end{pmatrix}.$$

Matrix C (for each individual sensor) may be represented by:

$$C = (R)_{3\times3}(N)_{3\times3}(\Lambda)_{3\times3} \qquad (13),$$

where $(R)_{3\times3}$ represents a 3×3 rotation matrix (or 3×3 special orthogonal matrix) whose elements are the calibration parameters of the mutual alignment error. A diagonal $(R)_{3\times3}$ signifies that there is no mutual alignment error for that particular sensor. The alignment error is a change in R or $\Delta R = R_{new}R_{old}^T$). $(N)_{3\times3}$ represents a 3×3 symmetric matrix whose elements are calibration parameters of the non-orthogonality error of the particular sensor. $(\Lambda)_{3\times3}$ represents a 3×3 diagonal matrix whose diagonal elements are the calibration parameters of the scale factor error of the particular sensor. Processing engine solves equation (13) by use of factorization techniques (e.g., polar decomposition, singular value decomposition (SVD), and the like) so as to determine calibration errors B, $\lambda$, N, R, T, $b_{therm.i}$, $\lambda_{therm.i}$. (diagrammatically represented in block 840) for each individual sensor output (collectively denoted $p_i$, $p_2 \ldots$, $p_s$ for each of the s individual outputs in FIG. 2) (also denoted by index i notation: $B_i$ $\lambda_i$ $N_i$, $R_i$, $T_i$, $b_{therm.i}$, $\lambda_{therm.i}$, respectively). Memory 704 (FIG. 1) is configured and operative to store the calibration errors for each sensor (where applicable).

Processing engine 702 is configured and operative to apply the re-calibration and re-synchronization parameters that were determined in phase 758 to those individual outputs that were detected to diverge. For example, processing engine 702 retrieves at least one of re-calibration parameters $B_i$, $\lambda_i$, $N_i$, $R_i$, $T_i$, $b_{therm.i}$, $\lambda_{therm.i}$, for the sensor outputs stored in memory 702, and applies the at least one re-calibration parameter to the respective sensor outputs. The collective re-calibration parameters (and re-synchronization parameters) $p_1$, $p_2$, . . . , $p_s$ are conveyed 762 to update and replace the currently used calibration and synchronization parameters in phase 752.

Returning to FIG. 2, data processing scheme 750 is configured and operative to continuously repeat multiple times over during operation (e.g., use) of IMS 700, for continuously collecting and combining data from individual sensor outputs to yield respective combined outputs, for detecting (phase 752), detecting (e.g., monitoring) divergence of individual sensor outputs (phase 754), for estimating revised combined outputs for only those individual outputs not diverging from their respective combined output (phase 765), for determining respective re-calibration parameters for those individual outputs diverging from their respective combined output (phase 758), and for applying the determined re-calibration parameters to those individual outputs that were detected to diverge.

There are other errors that are mitigated or minimized by the disclosed technique include for example, turn-on-bias. Turn-on-bias error manifests itself when some sensors possess a slightly different output bias at different turn-on times. The turn-on-bias error is minimized by employing the processing phases heretofore described. With respect to sensor aging, since different sensors may generally age differently, the use of the processing phases heretofore described can mitigate or minimize the effect of aging by detecting the particular sensor experiencing aging (or plurality thereof) and re-calibrating that sensor using the other sensors not detected to exhibit aging.

Figure 6:
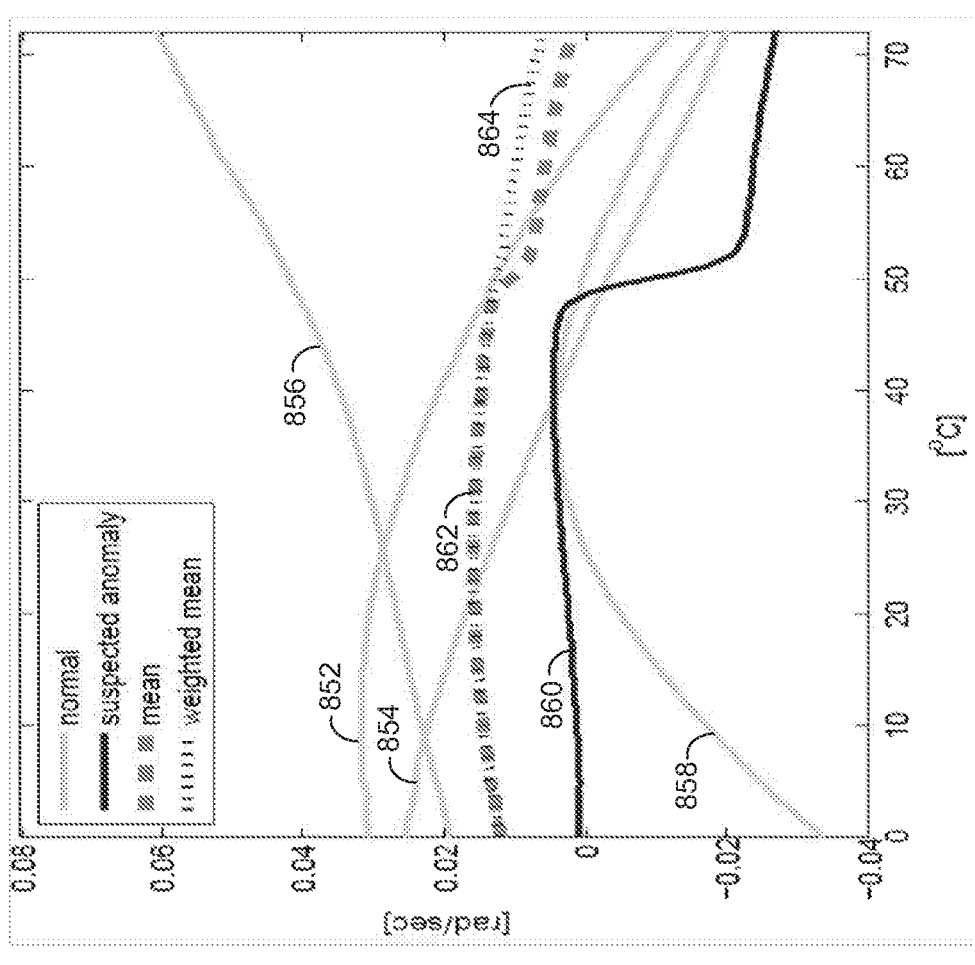
FIG. 6 illustrates experimental data graphs corresponding to the outputs of a multi-axis gyroscope sensor plotting gyroscope bias dependence on gyroscope sensor temperature, as well as combined outputs, constructed and operative in accordance with the embodiment of the disclosed technique.

Reference is now made to FIG. 6, which illustrates experimental data graphs corresponding to the outputs of a multi-axis gyroscope sensor plotting gyroscope bias dependence on gyroscope sensor temperature, as well as combined outputs, generally referenced 850, constructed and operative in accordance with the embodiment of the disclosed technique. FIG. 6 is an example of a particular implementation of the disclosed technique with respect to thermal bias. The vertical axis in 850 represents a measured physical property (in this case angular velocity in radians per second) and the horizontal axis represents temperature (in degrees Celsius). Specifically, FIG. 6 illustrates four data graphs 852, 854, 856, 858 corresponding to four individual outputs associated with a multiple-axis gyroscope MEMS sensor. Each of the different data graphs associated with a specific axis exhibits its distinct temperature dependent response (i.e., thermal bias, $b_{therm.}$). Particularly, graph 858 illustrates a suspected anomaly 860 in the data. Furthermore shown in FIG. 6 are two processed data graphs 862, 864, corresponding to two differently combined outputs. Combined output graph 862 represents a combined output that was determined (e.g., computed) according to an average (mean), while combined output graph 864 represents a combined output that was determined according to a weighted average (mean). The results of combined outputs 862 and 864 demonstrate that the effect of suspected anomaly 860 is minimized by IMS 700. Combined output graph 862 (representing a mean of individual sensor outputs) reduces the effects of suspected anomaly 860, which can be attributed to temperature-related errors affecting inertial sensor measurements (such as induced stress caused during the manufacturing process). Combined output graph 864 (representing a dynamically weighted mean of individual sensor outputs) reduces even further the effects of suspected anomaly 860, effectively enhancing the accuracy of inertial measurements outputted by IMS 700.

The disclosed technique further involves a self-calibrating inertial measurement method for minimizing the influence of stray measurements outputted from particular inertial sensors in a sensor cluster. In particular, in accordance with a further aspect of the disclosed technique there is thus provided an in-use self-calibrating inertial measurement method for minimizing errors of at least one inertial measurement unit (IMU) associated with calibration parameters. The method includes sampling at least one of acceleration and angular velocity with respect to at least one axis in a plurality of axes of a reference frame, producing a plurality of individual outputs associated with acceleration and angular velocity for at least one axis, combining the individual outputs to yield respective combined outputs, detecting which of the individual outputs diverges from at least one of data pertaining to the individual outputs (e.g., raw data, comparison data between the individual outputs) its respective combined output according to a decision rule with respect to at least one feature, estimating revised combined outputs for the individual outputs, according to the results of detecting, determining respective re-calibration parameters for those individual outputs diverging from their respective combined output, and updating, during operation of the at least one IMU, the calibration parameters with the re-calibration parameters for those individual outputs that were detected to diverge.

Reference is now made to FIG. 7, which is a schematic block diagram of a self-calibrating inertial measurement method, generally referenced 900, constructed and operative in accordance with the embodiment of the disclosed technique. Method 900 includes a plurality of procedures.

In procedure 902, at least one acceleration and angular velocity by at least one sensor cluster is sampled with respect to each axis in a plurality of axes in a reference frame, the sensor cluster including a plurality of inertial sensors producing outputs associated with the at least one of acceleration and angular velocity. With reference to FIGS. 1 and 2, sensor cluster 704 (FIG. 1) includes a plurality of inertial accelerometer sensors $710_1$, $710_2$, . . . , $710_J$, $710_{J+1}$, . . . , $710_K$, $710_{K+1}$, . . . , $710_L$, and gyroscope sensors $712_1$, $712_2$, . . . , $712_{J'}$, $712_{J'+1}$, . . . , $712_{K'}$, $712_{K'1}$, . . . , $712_{L'}$, that sample acceleration and angular velocity with respect to each axis X, Y, Z in reference frame 722, and produce respective outputs $x_1$, $x_2$, $x_3$, . . . , $x_N$ (FIG. 2) associated with the acceleration and angular velocity thereof.

In procedure 904, calibration and synchronization is applied to the individual outputs. With reference to FIGS. 1 and 2, processing engine 702 calibrates and synchronizes the individual sensor outputs, such that each sensor element output is associated with a particular axis in reference frame 722. Furthermore, processing engine time-wise synchronizes the outputs of the sensors.

In procedure 906, data from the individual sensor outputs are collected and combined to yield respective combined outputs. With reference to FIGS. 1 and 2, processing engine 702 collects and respectively combines (optionally with memory 706) individual outputs $x_1$, $x_2$, $x_3$, . . . , $x_N$ (FIG. 2) to yield respective combined outputs Xa, Ya, Za, Xg, Yg, Zg (phase 752) (e.g., according to equations (1)-(6)).

In optional procedure 908, auxiliary data from external sensors are acquired and utilized in procedure 906. With reference to FIG. 1, processing engine 702 is configured and operative to receive (e.g., via I/O interface 708, use data from memory 706, user input, etc.) auxiliary data provided from optional external sensors (not shown) (e.g., via global navigation satellite system (GNSS), such as Global Positioning System (GPS), Galileo positioning system, and the like, optical sensors, magnetic field trackers, etc.) so as to complement data outputted by sensor cluster 704.

In procedure 910, the individual sensor outputs that diverge from at least one of their inter-comparison, and their respective combined output are detected. With reference to FIGS. 1, 2, and 3, processing engine 702 detects which of individual sensor outputs $x_1$, $x_2$, $x_3$, . . . , $x_N$ (phase 754, FIG. 2) diverge from their respective combined output (FIG. 3). Alternatively, processing engine 702 is configured and operative to detect which of the individual outputs diverge from at least one of their inter-comparison (i.e., mutual comparison between individual outputs so as to determine divergence, e.g., carried out via a multi-set comparison algorithm).

In procedure 912, for only those individual outputs not diverging from their respective combined output, revised combined outputs are estimated. With reference to FIGS. 1, 2 and 3, processing engine 702 (FIG. 1) estimates a revised combined output Xa (e.g., "improved estimates") (FIG. 4) by excluding the contribution of sensor output $x_3$ (determined to diverge from Xa). In general, processing engine 702 estimates for N-s individual sensor outputs $x_{b_1}$, $x_{b_2}$, . . . , $x_{b_{N-s}}$ respective revised combined output(s) (phase 756, FIG. 2). Alternatively, processing engine 702 estimates revised combined outputs including contributions of at least one diverging sensor output by respectively adjusting (i.e., reducing) their corresponding weights (i.e., coefficient values).

In procedure 916, for those individual outputs diverging from their respective combined output, respective re-calibration parameters and re-synchronization parameters are determined. With reference to FIGS. 1, 2 and 5, processing engine 702 (FIG. 1) determines respective re-calibration parameters $B_i$, $\lambda_i$, $N_i$, $NL_i$, $R_i$, $T_i$, $b_{therm.i}$, $\lambda_{therm.i}$ (block 840, FIG. 5) and re-synchronization parameters for those individual sensor outputs diverging from their respective combined output (e.g., for individual output $x_3$ detected to diverge). In general, processing engine 702 determines for s individual sensor outputs $x_{b_1}$, $x_{b_2}$, . . . , $x_{b_{N-s}}$ detected to diverge from their respective combined outputs, re-calibration parameters $p_1$, $p_2$, . . . , $p_s$ (phase 758, FIG. 2). Procedure 916 (corresponding to phase 758) receives information from procedure 912 (corresponding to phase 758) pertaining to the estimated revised combined outputs (e.g., Xa, Ya, Za, Xg, Yg, Zg) denoted by 914.

In procedure 918, the determined re-calibration parameters and re-synchronization parameters are updated (applied) to those individual outputs that were detected to diverge. The calibration parameters are updated with re-calibration parameters, and synchronization parameters are updated with re-synchronization parameters. With reference to FIGS. 1, 2 and 5, processing engine 702 (FIG. 1) applies the determined re-calibration parameters $p_1$, $p_2$, . . . , $p_s$ (phase 758, FIG. 2) and re-synchronization parameters to each of the s individual sensor outputs $\tilde{x}_{b_1}$, $\tilde{x}_{b_2}$, . . . , $\tilde{x}_{b_{N-s}}$. Each i-th re-calibration parameter $p_i$ collectively denotes the range of i-th individual sensor output corrections $B_i$, $\lambda_i$, $N_i$, $NL_i$, $R_i$, $T_i$, $b_{therm.i}$, $\lambda_{therm.i}$ (FIG. 5). Procedures 902 through 918 in method 900 are continuously repeated 920 during operation of IMS system 700. Memory 706 (FIG. 1) is configured and operative to store the re-calibration and re-synchronization parameters (including initial and currently used calibration and synchronization parameters). According to one implementation, the steps of method 900 are performed separately for each physical property being sampled. Alternatively, the steps of method 900 are performed jointly for different physical properties being sampled. According to another implementation, the steps of method 900 are performed in unison for each physical property being sampled.

According to another aspect of the disclosed technique, there is thus provided a system and method for combining different measurements produced from different sensors having different dynamic ranges. Each sensor in sensor cluster 702 (FIG. 1) that is configured to measure a particular physical property (e.g., acceleration, angular velocity, temperature, magnetic field strength, etc.) has its respective operating dynamic range for measuring that physical property. For example, a particular sensor configured to very accurately detect diminutive movements (e.g., accelerations) may have a relatively low dynamic range, whereas another sensor configured to detect high acceleration rates may have a relatively high dynamic range, but relatively lower accuracy with respect to the former. Also, there may be groups of sensors in sensor cluster 702 each having the substantially same respective operating dynamic range. In general, sensors with different dynamic ranges and accuracies are required to detect different kinematical properties (i.e., properties describing the kinematics of at least one object, e.g., motion, acceleration, angular velocity, angular acceleration, etc.). The disclosed technique combines measurements from sensors having different dynamic ranges, thereby enabling to sample a wide diversified measurement range as well as generally more complex movement patterns.

More particularly, the disclosed technique discloses an inertial measurement system including at least one sensor cluster, and a processing engine. The sensor cluster includes a plurality of inertial sensors for sampling at least one of acceleration and angular velocity of at least one sensor cluster with respect to each axis in a plurality of axes of a reference frame. The sensor cluster is configured and operative for producing individual outputs associated with the acceleration and angular velocity of an inertial measurement unit (IMU). Each inertial sensor has its respective operating dynamic range and characteristic sensor response. At least part of the inertial sensors having different and partially overlapping operating dynamic ranges. The processing engine is configured and operative for receiving the individual outputs, detecting kinematical properties during operation of the at least one sensor cluster. For each axis, the processor is configured and operative for dynamically combining the individual outputs from the inertial sensors, according to an association that relates the different and partially overlapping operating dynamic ranges of the inertial sensors with detected kinematical properties, according to a predominance scheme relating to each characteristic sensor response.

Accordingly, there is provided an inertial measurement system (and method) generally having at least one sensor cluster (e.g., element 704, FIG. 1) that includes a plurality of inertial sensors, and a processing engine (e.g., element 702, FIG. 1). The inertial sensors are configured and operative to sample at least one of acceleration and angular velocity of at least one sensor cluster with respect to each axis in a plurality of axes of a reference frame (e.g., element 722, FIG. 1), and for producing individual outputs associated with the movement, where each inertial sensor has its respective operating dynamic range and characteristic sensor response. At least part of the inertial sensors, have different and partially overlapping operating dynamic ranges. The processing engine is configured and operative to receive the individual outputs, and detect kinematical properties during operation of at least one sensor cluster. For each axis, the processing engine is configured and operative to dynamically combine the individual outputs from the inertial sensors, according to an association that relates the different and partially overlapping operating dynamic ranges of the inertial sensors with the detected kinematical properties, and according to a predominance scheme relating to each characteristic sensor response.

Figures 8A, 8B, 8C:
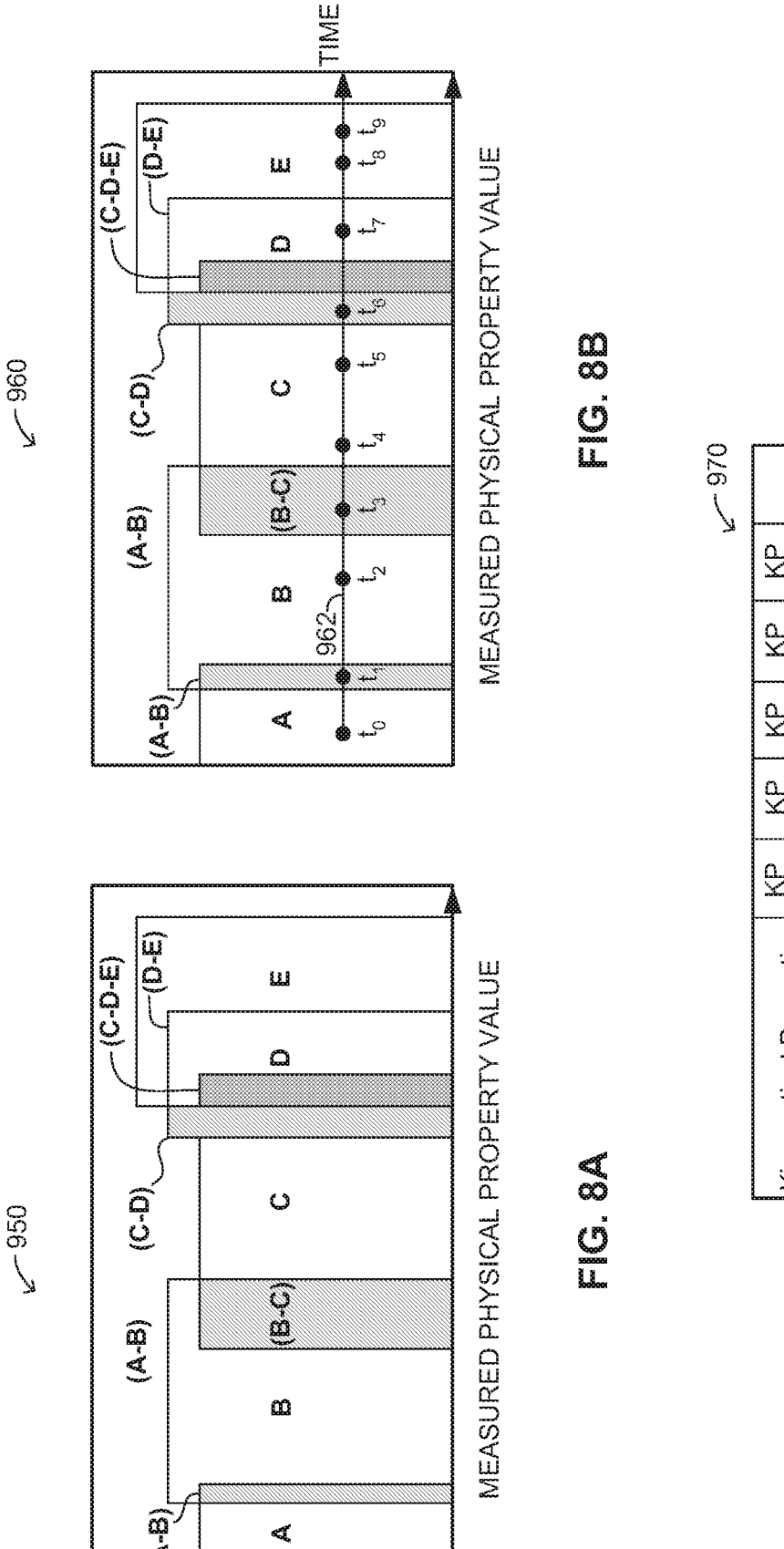
FIG. 8A is a schematic illustration of a plurality of partially overlapping sensor response areas, constructed and operative in accordance with the embodiment of the disclosed technique.
FIG. 8B is a schematic illustration of a time-dependent measured dynamic sensor response overlaid on the plurality of partially overlapping sensor response areas of FIG. 8A, constructed and operative in accordance with the embodiment of the disclosed technique.
FIG. 8C is a schematic illustration of an association that relates characteristic sensor responses and corresponding operational dynamic ranges with diverse kinematical properties, constructed and operative in accordance with the embodiment of the disclosed technique.

To further elucidate the particulars of this aspect of the disclosed technique, reference is now further made to FIG. 8A. FIG. 8A is a schematic illustration of a plurality of partially overlapping sensor response areas, generally referenced 950, constructed and operative in accordance with the embodiment of the disclosed technique. FIG. 8A illustrates a plurality of different sensor response areas, denoted "A", "B", "C", "D", and "E". Each sensor response area is shown on a chart in which the horizontal axis represents a particular value of a measured physical property by the sensor. At least part of the sensor response areas are partially overlapping among themselves (i.e., sensor response area A partially overlaps with sensor response area B in a mutual overlapping area denoted "(A-B)", sensor response area C partially overlaps with sensor response area D in a mutual overlapping area denoted "(C-D)", and so forth). For accelerometer sensors the measured physical property is acceleration. For gyroscope sensors the measured physical property is angular velocity. For temperature sensors the measured physical property is temperature, and so forth. Each sensor response area represents the characteristic response (i.e., the measured physical property value) of that sensor. Alternatively, for an ensemble of sensors having substantially the same characteristic response, each sensor response area represents the characteristic response for that ensemble of sensors (also referred interchangeably herein as "sensor ensemble"). Each characteristic sensor response (or characteristic sensor ensemble response for that matter) possesses its inherent dynamic range. The dynamic range for a sensor (or sensor ensemble) is defined as the range between the minimum measurable value of the physical property that the sensor (or sensor ensemble) can accurately measure to the maximum value of the physical property that the sensor can measure (i.e., useable measurements above the minimum signal-to-noise ratio (SNR) threshold and below the signal clipping threshold). Typically, a "usable" dynamic range for a sensor is normally lower than the entire defined dynamic range, since sensor measurements at the marginal ends of the range may occasionally be considered relatively less reliable than those at mid-range. For sensors exhibiting unreliable measurements at various portions of the defined dynamic range, the disclosed technique is configured and operative to make use of only the usable, relatively reliable portions of the range.

Reference is now further made to FIGS. 8B and 8C. FIG. 8B, which is a schematic illustration of a time-dependent measured dynamic sensor response overlaid on the plurality of partially overlapping sensor response area chart of FIG. 8A, generally referenced 960, constructed and operative in accordance with the embodiment of the disclosed technique. FIG. 8C is a schematic illustration of an association that relates characteristic sensor responses and corresponding operational dynamic ranges with diverse kinematical properties, generally referenced 970, constructed and operative in accordance with the embodiment of the disclosed technique. During operation of IMS 700, processing engine 702 receives the individual outputs of sensor cluster 704 and detects (i.e., characterizes, classifies) the kinematical properties (e.g., high acceleration, low angular velocity, etc.). The kinematical properties are defined as a characterization of the detected movement acquired by sensor cluster 704. FIG. 8B illustrates a time-dependent measured dynamic sensor response curve 962 corresponding to the detected dynamic movement conditions of a particular sensor (or sensor ensemble) of a particular group (i.e., $720_1$, $720_2$, $720_3$) of a particular sensor type (e.g., accelerometer, gyroscope, etc.) over a specific time period spanning between to $t_9$. Each of time the points $t_0$, $t_1$, $t_2$, $t_3$, $t_4$, $t_5$, $t_6$, $t_7$, $t_8$, and $t_9$ on chart 960 corresponds to a particular measurement of the measured physical property (e.g., sampled movement) by a sensor (or sensor ensemble), at a particular time. During operation and movement of IMS system 700, processing engine 702 (FIG. 1) is configured and operative to dynamically combine the individual outputs of the sensors in sensor cluster 704 (per sensor group and per sensor type) according to association 970 (e.g., representatively shown in FIG. 8C as a lookup table which memory 706 stores therein). The lookup table (i.e., association 970) in FIG. 8C relates the kinematical properties (e.g., herein denoted as "KP 1", "KP 2", "KP 3", "KP 4", KP 5", etc.) to one (simplified case) or more (complex case) respective characteristic sensor responses (A, B, C, D, E, etc.) having corresponding dynamic range (DR) (herein denoted as "$|DR_A|$", "$|DR_B|$", "$|DR_C|$", "$|DR_D|$", "$|DR_E|$", etc.). When processing engine 702 detects at time point to (FIG. 8A) (or a time period having multiple time points) a particular dynamical movement condition (e.g., KP1), corresponding to a measured physical property value by a particular sensor (or sensor ensemble) it retrieves from memory 704 data pertaining at least one association of the detected dynamical movement condition to a characteristic sensor response (e.g., A) (having a corresponding DR (e.g., $|DR_A|$). In other words, substantially at time point $t_0$, processing engine 702 determines that the kinematical properties would optimally be expressed by the output of the sensor (or sensor ensemble) having characteristic sensor response A (and corresponding dynamic range $|DR_A|$). At time point $t_1$, processing engine 702 determines that the kinematical properties (having been changed with respect to time point $t_1$), would optimally be expressed by the combined outputs of sensors (or sensor ensembles) having characteristic sensor responses A and B (i.e., the area of overlap denoted "(A-B)" in FIG. 8B). The contribution of the sensor outputs (of characteristic sensor responses A and B) are determined according to a predominance scheme (not shown), such as a weighted average, a lookup table, a function, an algorithm, data pertaining to the inertial sensors (collectively, per group, per type, or per individual sensor), and the like. The predominance scheme defines how an individual output yielded from a particular sensor takes precedence over (e.g., has greater weight) with respect to another individual output yielded from another sensor (according to various criteria such as individual sensor response, sensor DR, correlation between detected kinematical properties and dynamic ranges of the sensors, etc.). Processing engine 702 analogously determines the optimal combination of sensor output expression at other times points $t_3$ through $t_9$.

Reference is now further made to FIG. 8D, which illustrates three data graphs corresponding to the outputs of a 3-axis gyroscope sensor plotting gyroscope angular velocity measurements having non-linearity that is confined to a relatively narrow range. The example illustrated in FIG. 8D shows measurements of angular velocities for three axes (X, Y, Z) that exhibit non-linearity that is confined to a relatively narrow range (i.e., compared with the entire dynamic range). In accordance with the principles of the disclosed technique heretofore described, if this non-linearity is either a priori known or detected in real-time during operation of IMS system 700, processing engine 702 is configured and operative to adapt (i.e., adjust) the contribution of corresponding individual sensor outputs according to association 970 such that the combined output minimizes the effect of the individual output exhibiting the non-linearity (i.e., the coefficient or weight of that individual sensor output is minimized). This aspect of the disclosed technique (described in conjunction with FIGS. 14A-D) is compatible with the main aspect of the disclosed technique (described in conjunction with FIGS. 1-7). IMS system 700 is configured and operative to make use of (execute) these two aspects concurrently.

Additional aspects of the disclosed technique, apart from the typical use of IMS system 700 is for coupling to an object such as a platform capable of moving (e.g., a vehicle) include:

During operation, IMS system 700 supports dynamic addition of extra (e.g., new) sensor clusters (not shown) that are calibrated in advance. To harmonize calibration between the existing sensor cluster 704 and newly added sensor cluster only mutual alignment is required for calibration (achieved during operation of IMS 700, or alternatively subjecting the entire system to special dynamic scenarios (e.g., having a diverse range of accelerations and angular velocities).

Recalibrating several distinct sensor clusters may be achieved by mechanically coupling (e.g., rigidly attaching) a "golden" inertial measurement unit (i.e., a very reliable unit) to the IMS system 700 and subjecting both to special dynamic scenarios.

IMS system 700 may be employed for testing structural integrity and vibrations of a structure by simultaneously utilizing several sensor clusters (e.g., a plurality of sensor cluster 704) that are each positioned at different locations of the structure so as to enable comparison of acquired acceleration and angular velocity measurements. In addition, IMS system 700 may be employed to monitor slow and gradual changes to the structure, as well as enabling the analysis of vibrations.

IMS system 700 can combine (e.g., incorporate) measurements (individual sensor outputs yielded from inertial sensors) of different (at least two) sensor clusters that are coupled via external alignment devices (e.g., cameras, gimbals, trackers, etc.) (i.e., the sensor clusters are not rigidly directly connected to each other), such that their relative orientation is known via the external device. The at least two sensor clusters may be coupled together movement-wise.

It will be appreciated by persons skilled in the art that the disclosed technique is not limited to what has been particularly shown and described hereinabove. Rather the scope of the disclosed technique is defined only by the claims, which follow.

The invention claimed is:

1. An in-use self-calibrating inertial measurement system configured to provide on-the-fly calibration of one or more sensors of the system to thereby to minimize errors associated therewith, the system comprising:

at least one sensor cluster operably mounted to a vehicle that is a platform capable of moving, the at least one sensor cluster comprising a plurality of inertial sensors for:

sampling, during movement of said at least one sensor cluster and said vehicle, at least one of acceleration and angular velocity of said at least one sensor cluster with respect to each axis in a plurality of axes of a reference frame of a coordinate system; and producing individual outputs associated with said at least one of acceleration and angular velocity, at least three of said inertial sensors sampling with respect to each same respective said axis; and a processing engine operably coupled to the at least one sensor cluster and configured to receive said individual outputs from the plurality of inertial sensors, said processing engine comprising a hardware processor coupled to non-transitory, computer-readable memory containing instructions executable by the processor to cause the processing engine to use said individual outputs acquired, during movement of said at least one sensor cluster and said vehicle, to dynamically self-calibrate, during movement of said inertial measurement system and said-vehicle, a parameter that includes at least a scale factor, wherein said dynamic self-calibration comprises:

for each particular sensor type, combining said individual outputs of a particular sensor type, per said axis, to respectively yield a combined output;

detecting a specific diverging individual output by at least one of inter-comparison between said individual outputs and its respective said combined output, according to a majority of non-diverging individual outputs;

determining a re-calibration parameter for said specific diverging individual output according to said majority of non-diverging individual outputs, based on an assessment of a range of possible systematic errors potentially associated with causing the specific individual output of a particular sensor type to diverge from a respective combined output, said systematic errors being selected from the group consisting of bias error, gain error, non-linearity error, mutual alignment error, thermal gain error, and thermal bias error, said assessment for said systematic errors comprises:

1) determining whether an error of an inertial sensor associated with the specific diverging individual output is present by running one or more of a bias error model, scale factor error model, non-linearity error model, mutual alignment error model, time synchronization error model, and performing statistical analysis to identify statistically significant correlations of rapid changes in gain, bias, and/or non-orthogonality coinciding with temperature changes; and 2) determining an extent of any errors determined to be present comprising at least one of a quantity, magnitude, and value with respect to a given error model and/or statistical analysis; and calibrating said specific diverging individual output by applying said determined re-calibration parameter to said specific diverging individual output thereby updating, during operation and during movement of said at least one sensor cluster and said vehicle, said parameter with said re-calibration parameter of said specific individual output detected to diverge, wherein application of said re-calibration parameter reduces systematic errors identified as being associated with causing the specific individual output to diverge.

2. The in-use self-calibrating inertial measurement system according to claim 1, wherein said parameter further includes individual cross-axis sensitivity of said specific diverging individual output detected to diverge, by applying an individual cross-axis correction.

3. The in-use self-calibrating inertial measurement system according to claim 1, wherein said parameter further includes individual bias of said specific diverging individual output detected to diverge, by applying an individual bias correction.

4. The in-use self-calibrating inertial measurement system according to claim 1, wherein said inertial sensors are selected from at least one of type: accelerometers configured to measure acceleration, and gyroscopes configured to measure angular velocity.

5. The in-use self-calibrating inertial measurement system according to claim 1, wherein said processor is configured to receive auxiliary external data from at least one external device that is at least one of: an external inertial navigation system (INS), a satellite navigation system, another sensor cluster, an external calibration device, a computer, and an input/output (I/O) interface.

6. The in-use self-calibrating inertial measurement system according to claim 1, wherein said processor is configured to initially perform at least one of: time-wise synchronizing said individual outputs of said inertial sensors, and calibrating said inertial sensors.

7. The in-use self-calibrating inertial measurement system according to claim 6, wherein said processor is configured to determine a re-synchronization parameter for said diverging individual output and update a synchronization parameter with said re-synchronization parameter.

8. The in-use self-calibrating inertial measurement system according to claim 1, wherein said processor is further configured to perform one of, according to said detecting:

estimate, respectively, a revised combined output to at least part of said individual outputs;

estimate, respectively, a revised combined output from only said individual outputs not diverging from their respective said combined output; and estimate, respectively, a revised combined output from all respective said individual outputs.

9. The in-use self-calibrating inertial measurement system according to claim 1, wherein said processor is configured to further dynamically self-calibrate at least one of:

a non-linearity error of those said inertial sensors whose said individual outputs were detected to diverge, by respectively applying non-linearity corrections;

a thermal gain error of those said inertial sensors whose said individual outputs were detected to diverge, by respectively applying thermal gain corrections; and a thermal bias error of those said inertial sensors whose said individual outputs were detected to diverge, by respectively thermal bias corrections.

10. The in-use self-calibrating inertial measurement system according to claim 1, wherein said processing engine is configured to determine whether a bias error of an inertial sensor associated with the specific diverging individual output is present and determine an extent of said bias error based on said bias error model:

$$x(t)=W(t)+B+\xi(t)$$

wherein: x(t) is the measurement output of a particular sensor in a particular sensor group of a particular, dependent on time (t); W(t) is a measured physical property; B is the bias error of the particular sensor; and $\xi(t)$ represents the noise of a measurement.

11. The in-use self-calibrating inertial measurement system according to claim 1, wherein said processing engine is configured to determine whether a gain error of an inertial sensor associated with the specific diverging individual output is present and determine an extent of said gain error based on said scale factor error model:

$$x(t)=N\Lambda \cdot W(t)+\xi(t)$$

wherein: x(t) is the measurement output of a particular sensor in a particular sensor group of a particular, dependent on time (t); λ represents the scale factor error, in that Λ=diag(λ) and a gain error is expressed as a gain matrix in the form S=NΛ, where N is a non-orthogonality compensation matrix and Λ is the scale factor error; W(t) is a measured physical property; and ξ(t) represents the noise of a measurement.

12. The in-use self-calibrating inertial measurement system according to claim 1, wherein said processing engine is configured to determine whether a non-linearity error of an inertial sensor associated with the specific diverging individual output is present and determine an extent of said non-linearity error based on said non-linearity error model:

$$x(t)=\text{diag}(NL(W(t))) \cdot W(t)+\xi(t)$$

wherein: x(t) is the measurement output of a particular sensor in a particular sensor group of a particular, dependent on time (t); NL represents a non-linearity error; W(t) is a measured physical property; and ξ(t) represents the noise of a measurement.

13. The in-use self-calibrating inertial measurement system according to claim 1, wherein said processing engine is configured to determine whether a mutual alignment error of an inertial sensor associated with the specific diverging individual output is present and determine an extent of said mutual alignment error based on said mutual alignment error model:

$$x(t)=R \cdot W(t)+\xi(t)$$

wherein: x(t) is the measurement output of a particular sensor in a particular sensor group of a particular, dependent on time (t); R represents an alignment error with respect to a coordinate system; W(t) is a measured physical property; and ξ(t) represents the noise of a measurement.

14. The in-use self-calibrating inertial measurement system according to claim 1, wherein said processing engine is configured to determine whether a time synchronization error of an inertial sensor associated with the specific diverging individual output is present and determine an extent of said time synchronization error based on said time synchronization error model:

$$x(t)=W(t+T)+\xi(t+T)$$

wherein: x(t) is the measurement output of a particular sensor in a particular sensor group of a particular, dependent on time (t); T represents the time synchronization error; W(t) is a measured physical property; and ξ(t) represents the noise of a measurement.

15. An in-use self-calibrating inertial measurement method for providing on-the-fly calibration of one or more sensors of at least one inertial measurement unit (IMU) to thereby minimize errors associated therewith, the method comprising:

providing the at least one IMU, including at least one sensor cluster, operably mounted to a vehicle that is a platform capable of moving;

sampling, during movement of said at least one sensor cluster and said vehicle, via one or more of a plurality of inertial sensors of the at least one sensor cluster, at least one of acceleration and angular velocity with respect to at least one axis in a plurality of axes of a reference frame of a coordinate system;

producing, via the one or more of a plurality of inertial sensors, a plurality of individual outputs associated with said at least one of acceleration and angular velocity for said at least one axis;

dynamically self-calibrating, via a processing engine operably coupled to the at least one sensor cluster and configured to receive said individual inputs from the one or more of the plurality of inertial sensors, a parameter that includes at least a scale factor, during movement of said at least one IMU and said vehicle, using said individual outputs acquired during movement of said at least one IMU and said vehicle, by:

for each particular sensor type, combining said individual outputs of a particular type, per axis, to respectively yield a combined output;

detecting a specific diverging individual output by at least one of their inter-comparison between said individual outputs, and its respective said combined output, according to a majority of non-diverging individual outputs;

determining a re-calibration parameter for said specific diverging individual output according to said majority of non-diverging individual outputs, based on an assessment of a range of possible systematic errors potentially associated with causing the specific individual output of a particular sensor type to diverge from a respective combined output, said systematic errors being selected from the group consisting of bias error, gain error, non-linearity error, mutual alignment error, thermal gain error, and thermal bias error, said assessment for said systematic errors comprises:

1) determining whether an error of an inertial sensor associated with the specific diverging individual output is present by running one or more of a bias error model, scale factor error model, non-linearity error model, mutual alignment error model, time synchronization error model, and performing statistical analysis to identify statistically significant correlations of rapid changes in gain, bias, and/or non-orthogonality coinciding with temperature changes; and 2) determining an extent of any errors determined to be present comprising at least one of a quantity, magnitude, and value with respect to a given error model and/or statistical analysis; and calibrating said specific diverging individual output by applying said determined re-calibration parameter to said specific diverging individual output thereby updating, during operation and during movement of said at least one IMU and said vehicle, said parameter with said re-calibration parameter of said specific individual output detected to diverge, wherein application of said re-calibration parameter reduces systematic errors identified as being associated with causing the specific individual output to diverge.

16. The in-use self-calibrating inertial measurement method according to claim 15, further including estimating a revised combined output for said individual outputs, according to said detecting.

17. The in-use self-calibrating inertial measurement method according to claim 16, wherein said estimating said revised combined output is from only those said individual outputs not diverging from their respective said combined output.

18. The in-use self-calibrating inertial measurement method according to claim 15, further comprising applying an initial calibration to said calibration parameters associated with said individual outputs, prior to said producing.

19. The in-use self-calibrating inertial measurement method according to claim 15, further comprising performing synchronization to said individual outputs, according to synchronization parameters, prior to said producing.

20. The in-use self-calibrating inertial measurement method according to claim 19, further comprising determining a re-synchronization parameter for said diverging individual output diverging from its respective said combined output.

21. The in-use self-calibrating inertial measurement method according to claim 15, wherein the method steps are performed at least one of separately for each physical property being sampled, and jointly for different physical properties being sampled.

22. The in-use self-calibrating inertial measurement method according to claim 15, wherein said calibration parameters are selected from a list consisting of:

scale factor;
cross-axis sensitivity;
bias;
alignment;
non-linearity;
thermal bias;
thermal gain; and
gyroscopic inertial bias.

23. The in-use self-calibrating inertial measurement method according to claim 15, further comprising:

detecting kinematical properties during operation of said IMU, each of said inertial sensors has its respective operating dynamic range and characteristic sensor response, at least part of said inertial sensors having different and partially overlapping operating dynamic ranges; and combining, dynamically, said individual outputs according to an association that relates said different and partially overlapping operating dynamic ranges with detected said kinematical properties, according to a predominance scheme relating to each said characteristic sensor response.

* * * * *